(12) United States Patent
Denton et al.

(10) Patent No.: US 8,148,594 B2
(45) Date of Patent: Apr. 3, 2012

(54) PROCESS FOR TREATING RADIOACTIVE WASTE WATER TO PREVENT OVERLOADING DEMINERALIZER SYSTEMS

(75) Inventors: Mark S. Denton, Knoxville, TN (US); John M. Raymont, Jr., Columbia, SC (US); Hubert W. Arrowsmith, Knoxville, TN (US)

(73) Assignee: EnergySolutions Diversified Services, Inc., Columbia, SC (US)

( * ) Notice: Subject to any disclaimer, the term of this patent is extended or adjusted under 35 U.S.C. 154(b) by 1275 days.

(21) Appl. No.: 11/834,098

(22) Filed: Aug. 6, 2007

(65) Prior Publication Data
US 2009/0038961 A1 Feb. 12, 2009

(51) Int. Cl.
*A62D 3/33* (2007.01)
(52) U.S. Cl. ........................... 588/409; 588/315
(58) Field of Classification Search ............... 588/1, 18, 588/20, 313, 315, 317, 318, 400, 409, 410, 588/405, 901
See application file for complete search history.

(56) References Cited

U.S. PATENT DOCUMENTS

| | | | |
|---|---|---|---|
| 4,594,215 A | 6/1986 | Panson et al. | |
| 4,842,812 A | 6/1989 | Panson et al. | |
| 5,266,494 A | 11/1993 | Lahoda et al. | |
| 5,640,701 A | 6/1997 | Grant et al. | |
| 5,658,450 A | 8/1997 | Tamarkin | |
| 6,099,738 A | 8/2000 | Wechsler et al. | |
| 6,518,477 B2 | 2/2003 | Soundararajan | |
| 6,663,783 B2 | 12/2003 | Stephenson et al. | |
| 6,797,179 B2 | 9/2004 | Arnaud | |
| 7,045,065 B2 | 5/2006 | Penafiel et al. | |
| 2003/0121864 A1 | 7/2003 | Kin et al. | |
| 2004/0027269 A1 | 2/2004 | Howard | |
| 2004/0251213 A1 | 12/2004 | Bradley | |
| 2004/0254417 A1 | 12/2004 | Vladimirov | |
| 2005/0045534 A1 | 3/2005 | Kin et al. | |
| 2005/0117690 A1 | 6/2005 | Hemmi et al. | |
| 2005/0126918 A1 | 6/2005 | Kin et al. | |
| 2005/0224338 A1 | 10/2005 | Kin et al. | |
| 2005/0230321 A1 | 10/2005 | Berrak et al. | |
| 2007/0131621 A1 | 6/2007 | Denton | |

OTHER PUBLICATIONS

WebpageAREVA (article entitled Electromagnetic Filter) dated Oct. 27, 2005, Author Unknown, from http://www.us.framatome-anp.com/nuclearservices/electromagnetic.htm.

Webpage WME Environment Business Media (article entitled the Top 20 Water Technologies) dated Oct. 27, 2005, author unknown, from http://www.wme.com.au/categories/water/nov5_04.php.

Webpage Abfrageergebnisse (article entitled Electrocoagulation: An Environment-Friendly Method for Separation of Fine Particles From Water) dated Oct. 27, 2005, author unknown from http://www.bit .or.at/irca/bbsshow8.php?refl=TO-BUT-08&vQuelle=EcoundCo&cc=.

Publication pp. 5 and 6 entitled 1.4.1 Theory of Coagulation and 1.4.2 Theory of Electrocoagulation) p. 5 and 6 from General Environmental Corporation, Innovative Technology Evaluation Report, Sep. 1998 (EPA/540/R-96/502); Author: National Risk Management Research Lab, Office of Research & Development, Cincinnati, OH.

*Primary Examiner* — Edward Johnson
(74) *Attorney, Agent, or Firm* — Holland & Hart

(57) ABSTRACT

A process and system for treating waste water containing contaminants to prevent excessive accumulation on demineralizer media of a driver contaminate capable of such accumulation before another contaminant can reach a predetermined level of accumulation. The waste water is treated upstream of the demineralizer media with removal means for specifically removing the driver contaminant while leaving the other contaminant for subsequent removal by the demineralizer media. The amount of accumulation on the demineralizer media of the other contaminant is monitored, and the supplying of treated waste water to the demineralizer media is terminated when its accumulation reaches the predetermined level.

31 Claims, 8 Drawing Sheets

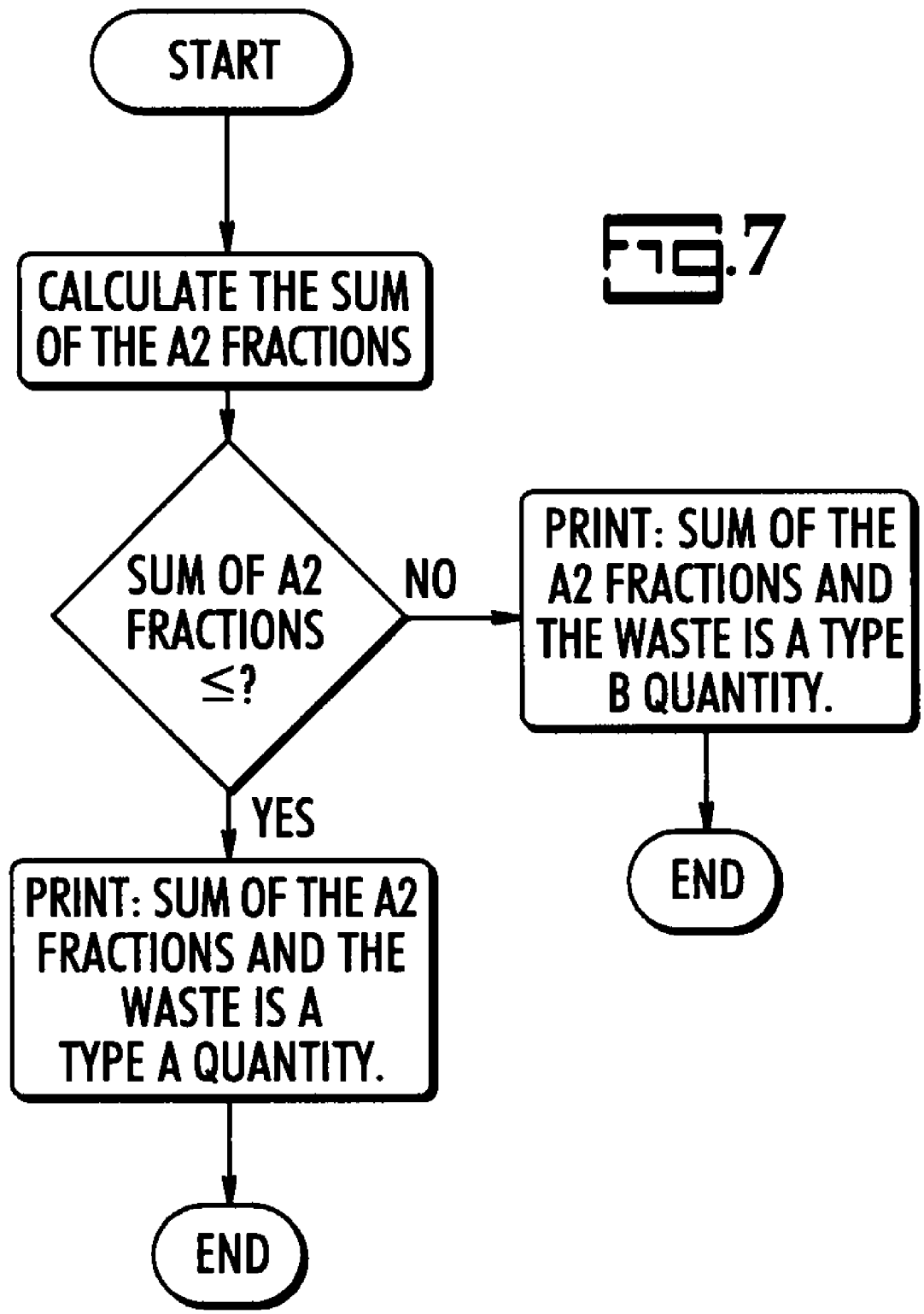

PROCESS FOR TREATING RADIOACTIVE WASTE WATER TO PREVENT OVERLOADING DEMINERALIZER SYSTEMS

BACKGROUND OF THE INVENTION

The process and apparatus of the invention relate to processing waste water from nuclear power reactors and other sources of water contaminated with radionuclides and other interfering materials and/or contaminates. In particular, the present process and apparatus are related to processing waste waters contaminated with colloidal, suspended and dissolved radionuclides and other contaminates.

In the commercial nuclear power industry, there are primarily two types of reactor systems used in Nuclear Power Plants (NPP's), namely boiling water reactors (BWR's) and pressurized water reactors (PWR's). Both use water to moderate the speed of neutrons released by the fissioning of fissionable nuclei, and to carry away heat generated by the fissioning process. Both also use water to generate steam for rotating the blades of a turbine generator. Water flows through the reactor core, is recycled, and inevitably becomes contaminated with iron (Fe-55), nickel (Ni-63), colloidal and soluble cobalt (Co-58, and Co-60), cesium (Cs-137), and other radionuclides. The water further becomes contaminated with non-radioactive organics, e.g., oils, greases and total organic carbon (TOC), biologicals, and colloids (e.g., iron rust).

In a boiling water reactor (BWR), the water passing through the core will be used directly as steam in driving turbine-generators for the production of electricity. In a pressurized water reactor (PWR), the primary water that flows through the reactor is isolated by steam generators from the secondary water that flows through the turbine generators. In both cases, while the chemical constituents of the waste water will be different, these reactor systems will produce radionuclides and colloidal, suspended and dissolved solids that must be removed before the waste water may be reused or released to the environment.

The presence of iron (as iron oxide from carbon steel piping) in Boiling Water Reactor (BWR) circuits and waste waters is a decades old problem. The presence and buildup of this iron in condensate phase separators (CPS) further confounds the problem when the CPS tank is decanted back to the plant. Iron carryover here is unavoidable without further treatment steps. The form of iron in these tanks, which partially settles and may be pumped to a de-waterable high integrity container (HIC), is particularly difficult and time-consuming to dewater. Adding chemicals upstream from the CPS, such as flocculation polymers, to precipitate out the iron only produces an iron form even more difficult to filter and dewater. For example, such chemically pretreated material contains both floc particles of sizes up to 100 microns and also submicron particles. It is believed that the sub-micron particles penetrate into filter media, thus plugging the pores and preventing successful filtration of the larger micron particles.

Like BWR iron-containing waste waters, fuel pools, or "basins," (especially during the decontamination phase) often contain colloids which make clarity and good visibility nearly impossible. Likewise, miscellaneous, often high-conductivity, waste steams at various plants contain such colloids as iron, salts (sometimes via seawater intrusion), dirt/clay, surfactants, waxes, chelants, biologicals, oils and the like. Such waste streams are not ideally suited for standard dead-end cartridge filtration or cross-flow filtration via ultrafiltration media (UF) and/or reverse osmosis (RO), even if followed by demineralizers. Filter and bed-plugging by these various compounds are almost assured.

According to the Nuclear Energy Institute[1], America's nuclear power plants (NPPs) generate more than half the volume of the nation's low-level radioactive waste (LLRW). The LLRW from the NPPs typically includes water purification filters and resins, tools, protective clothing, plant hardware, and wastes from reactor cooling water cleanup systems. Depending on the class of the LLRW (designated as classes A, B, and C by the Nuclear Regulatory Commission), the LLRW may be sent for disposal either to the Barnwell site in South Carolina or to the Clive, Utah, site of Energy Solutions (ES), formerly the Environcare Utah site. Barnwell accepts all classes of LLRW, whereas ES currently is approved only for Class A waste, which has the lowest activity limits of the three classes.

The Barnwell site is scheduled for closure in 2008. Consequently, if ES has not received approval for disposal of Class B and C wastes by that time, it is imperative that LLRW generators minimize or eliminate the production of these waste classes and produce only Class A wastes or face indefinite on-site storage of wastes exceeding Class A limits. Should ES eventually be approved for disposal of the higher activity wastes, production of Class A wastes will still be advantageous to LLRW waste generators because of the lower cost of disposal of this less hazardous class of wastes.

Class A waste, depending on the constituents and activity, can be disposed of in either bulk trench or containerized trench and makes up nearly 80% of the market. As pointed out previously, Energy Solutions of Utah can currently take only Class A waste. Furthermore, even though Barnwell can take Class A, B, and C wastes at the present time, this site is scheduled to close in 2008. In reality, the disposal classification at ES, and nationwide, is more complicated than this simplified picture. There are actually four (4) classifications of radioactive wastes as defined by 10 CFR 61.55. Determination of a waste's classification is based on the concentrations of specific long-lived radioisotopes listed in Table 1 of 10 CFR 61.55 and of specific short-lived isotopes listed in Table 2 of 10 CFR 61.55.

Utilizing Tables 1 and 2 in the Utah Waste Classification System from the Utah Administrative Code (UAC) R313-15-1008, along with the stipulations outlined in 10 CFR 61.55, wastes are determined to be Class A, Class B, Class C, or Greater Than Class C (GTCC). The Utah Waste Classification System is similar to the NRC Waste Classification System in 10 CFR 61.55, except that it includes Radium-226 as a Table 1 radionuclide. Class A is the least hazardous waste class and GTCC is the most hazardous. The waste is Class A if it does not contain more than the indicated amounts of the isotopes listed in Tables 1 and 2. A compilation of Tables 1 and 2 as shown in Table I below entitled Classification of Low-Level Radioactive Waste. Table I illustrates the concentration limits for low-level radioactive waste.

TABLE I

Classification of Low-Level Radioactive Waste

| Radionuclide | Concentration Limit | | |
|---|---|---|---|
| | Class A | Class B | Class C |
| Total of $t^{1/2}$ >5 yrs. (Ci/m3) | 700 | None | none |
| 3H (Ci/m3) | 40 | None | none |
| 14C (Ci/m3) | 0.8 | | 8 |
| 14C in activated metal (Ci/m3) | 8 | | 80 |

TABLE I-continued

Classification of Low-Level Radioactive Waste

| | Concentration Limit | | |
|---|---|---|---|
| Radionuclide | Class A | Class B | Class C |
| 59Ni in activated metal (Ci/m3) | 22 | | 220 |
| 60Co (Ci/m3) | 700 | None | none |
| 63Ni (Ci/m3) | 3.5 | 70 | 700 |
| 63Ni in activated metal (Ci/m3) | 35 | 700 | 7000 |
| 90Sr (Ci/m3) | 0.04 | 150 | 7000 |
| 94Nb in activated metal (Ci/m3) | 0.02 | | 0.2 |
| 99Tc (Ci/m3) | 0.3 | | 3 |
| 129I (Ci/m3) | 0.008 | | 0.08 |
| 137Cs (Ci/m3) | 1 | 44 | 4600 |
| TRU with t½ >5 yrs. (nCi/g) | 10 | | 100 |
| 241Pu (nCi/g) | 350 | | 3,500 |
| 242Cm (nCi/g) | 2,000 | | 20,000 |
| 226Ra (Ci/m3) | 10 | | 100 |

There are a number of prior art techniques used for removal of radionuclides and colloidal, suspended and dissolved solids, and the requirement to remove such materials from waste waters is not unique to nuclear reactors. However, the nature of nuclear reactors raises special concerns about the use of additives for chemical treatments because of the desire to avoid adding any chemical compounds that might make the radioactive wastes also hazardous chemical wastes. Waste that is both radioactive and chemically hazardous is referred to as mixed waste.

There are other concerns as well. The processed waste water must be quite free of radioactive contaminants if it is to be released to the environment. The radioactive material extracted from the waste water during processing must be stable or in a form that can be stabilized for disposal in a way that meets disposal site requirements, particularly with respect to preventing the leaching out of radioactive contaminates by liquid water. In addition, the final cleanup of the waste water often employs demineralizers containing ion exchange resins and other ion removal media and, as explained further below, it is highly desirable that the buildup of radionuclides on these media be restricted to radioactivity levels (measured in Curies) that do not exceed the limits established for Class A waste in order to permit disposal of depleted resins at repositories licensed to receive such wastes. Finally, the volume of radioactive wastes of all classifications must be minimized because of both the limited space available for disposal of these wastes and the high cost of their disposal.

Water processing media (ion exchange resins, adsorbents, activated carbon, zeolites, etc.) are an important part of systems that remove radionuclides and other contaminants from waste water. Replacement of these media is needed when they become saturated with contaminants to the extent that their usefulness is significantly impaired, i.e., they must go out of service on either capacity, radiation dose or differential pressure.

Spent ion exchange (IX) resins and other media from demineralizers therefore represent a significant portion of the LLRW produced by NPPs. When treating plant waste waters, these media often are depleted by the non-radioactive ionic species, which may be at higher concentrations than the radioactive species by numerous orders of magnitude. After media dewatering, samples of the spent media bed are taken and analyzed to determine the class for disposal. Obviously, the lower the concentration of non-radioactive ionic species, the higher is the chance that the media bed will be greater than Class A.

Past practice to minimize costs has been to load demineralizer media with contaminants to the maximum extent feasible before removal. However, recent increases in disposal site fees and future site closures for Class B and C wastes have effectively nullified this strategy. Disposal fees for Class B and C wastes are now sufficiently higher than for Class A waste that it is most cost-effective to remove demineralizer media before they exceed the Class A limit. Further, the main site for disposal of Class B and C wastes in Barnwell, S.C., is being completely phased out from taking waste from most states by Jun. 30, 2008. These two factors drive a need for more effective strategies for managing radioactive wastes and, in particular, reducing the amount of Class B and Class C wastes.

Accordingly there is a need for better ways of processing radioactive waste water containing contaminants in the form of dissolved ions and/or suspended solids, both radioactive and non-radioactive, from nuclear power reactors and other sources.

SUMMARY OF THE INVENTION

The foregoing considerations are some of the reasons that the present invention employs four mechanisms individually and in common to manage the radioactive waste water. The management of the waste water results not only in a clean effluent and a suitably stable waste form, but also improves the segregation efficiency of the waste so that, for example, less class B and C waste is present in the demineralizer waste leaving only Class A and the demineralizer system is more efficiently used. Accordingly, consistent use of the present invention will reduce the number of shipments of Class B and C waste and also of Class A, and will reduce relative disposal costs for the generator. There are other significant advantages as well.

The first of the four mechanisms is the use of a removal means, such as ion-specific media or ion-specific seeding agents, for removal of specific ions upstream of demineralizer media and a computer program to insure that the demineralizer media will not exceed the radionuclide limits for Class A waste, or for lower-level Class B waste wherein the radionuclide content of the media accumulating Class B waste is sufficiently small that it can be mixed with or added to other waste so that the mixture does not exceed Class A limits when containerized.

Thus, because of the potential loss of a disposal site for LLRW's that are greater than Class A, as well as the high costs of disposal for such wastes, the invention has been developed to provide a process to ensure that IX resins, other media or compounds in demineralizers do not exceed Class A disposal limits when processing waste waters at commercial NPPs. This process may uses a media (or mix of media) that is ion specific media (ISM) for upstream removal (segregation) of driver radionuclides so that downstream demineralizer media can be used efficiently and will only reach Class A or low activity Class B levels when more fully-loaded with other non-driver radionuclides. This media also has been dubbed SMART™ Media (SM) since it will maintain such downstream levels with minimum operator intervention. Such a SMART™ Media may comprise both IX resins and specialty (ion specific) resins and includes both granular and non-IX media.

An alternative to the use of ion-specific media is the use of seeding agents for down-stream electro-coagulation. Seeding the use of selective, sub-micron-sized chemical agents to form colloidal complexes with contaminants that, with the use of electro-coagulation, can be removed. Those contaminants may be radioactive waste drivers, bleeders, which tend to clog down-stream filters before those filters are loaded with radioactive contaminants such silica, calcium or magnesium, or compounds that can be reused in a NPP such as boron. For example, seeding with potassium hexacyanoferrate, allows cesium, a significant waste driver, to be attached to this ferromagnetic molecule that can be separated using various filtration techniques including electromagnetic filtration. Seeding agents have an advantage over resins or other ion exchange media in that they are much more efficient because of their relatively small size.

The second mechanism is electro-coagulation itself. This second mechanism allows removal of colloidal species and is largely based on the technique described in co-pending patent application Method and System for Treating Radioactive Waste Water, Ser. No. 11/303,065, filed Dec. 14, 2005 which is incorporated herein in its entirety. This mechanism uses metal electrodes in electro-coagulation to remove species either because they are drivers of higher classifications of waste, such as class B and C, or because they are not radioactive but would tend to cause a scale or to foul filters or membranes downstream. The use of electro-coagulation also effectively kills biological contaminants in the waste when it separates water molecules into hydrogen gas and oxygen gas. The oxygen gas oxidizes the biological contaminates thereby killing them. These gases also facilitate flocculating the contaminants by adding bouyancy.

Electro-coagulation also allows other constituents in the waste water to be recovered for reuse, such as boron which is used to control the nuclear reaction rate in reactor cores.

The third mechanism is the use of careful monitoring of the waste being loaded into disposal containers. The monitoring is done by a redundant system of computer-controlled sensors and radiation monitors. The sensors measure what wastes enter the containers and what leave, thereby allowing the programmed computer to infer from calculations the increasing radioactive content of the waste in the containers while the radiation monitors confirm those calculations in real time.

The fourth technique is a system of sequencing interconnected containers so that the user can always switch between a lead container and a lagging container. As the lead container approaches capacity, it is switched to the lag position by opening and closing valves so that it reaches capacity very slowly thus avoiding a load that exceeds lower waste class limits.

Some of these mechanisms are always used such as monitoring. The first two techniques are nearly always possible particularly EC. The process in general is as follows. First, the aqueous radwaste in a waste storage or "feed" tank is analyzed to determine its radionuclide content. Then, these analysis data are used as the basis for employing ion-specific removal techniques, such as ion-specific removal means (also referred to herein as ISM or selective electro-coagulation seeding), to selectively remove from the aqueous radwaste, such as that kept at nuclear power plants (NPP), those radionuclides (driver constituents) that tend to drive demineralizer media from Class A to a higher class. Examples of such drivers are cesium, cobalt and nickel.

Once at least some portion of the drivers are removed, demineralization takes place wherein influent and effluent analysis data and computer software are used to determine the quantity of remaining radionuclides that are being removed from the aqueous waste and deposited on the ion exchange (IX) resins or other media in the demineralizer vessels. For gross measuring of the buildup of these deposits, radiation monitors are used to measure and input to the software the level of gross gamma radiation from the demineralizer vessel(s) in service. When a predetermined set-point is reached, for example within 80 to 85 percent of the Class A limits, the gamma monitors preferably trigger an initial alarm to alert an operator that the buildup may be approaching the maximum level for Class A limits.

As the continuing buildup of radionuclides on demineralizer media nears the maximum level, for example within 90 to 95 percent (or possibly as high as 99 percent) of the Class A limits, as determined from data input to the computer, the software triggers a further alarm indicating that the demineralizer vessel concerned should be removed from being first in line. When so removed as the lead vessel, this vessel may be further used as a "lag" vessel for continuing removal of non-radioactive ionic species, such as bleeder ions, until the media becomes entirely depleted. This depleted vessel is then packaged for shipment to a disposal site for Class A waste. Alternatively, when the lead vessel reaches its maximum loading of radionuclides, it may be immediately removed from service and shipped to the disposal site without being employed as a lag vessel.

Thus, the keys to reducing the amount of Class B and C waste are: 1) accurate analysis of the radionuclides and other ionic content of the waste water being treated, 2) selective upstream removal of each specific driver identified by this analysis employing an effective and economical removal means, 3) accurately and economically following the loading (buildup) of the remaining radionuclides and/or other ions on the demineralizer media, and 4) terminating use of the demineralizer media just in advance of the loading that would change it from Class A to Class B or C waste.

For carrying out task 2 of the preceding paragraph, the invention may utilize (1) a conventional coagulation and filtration system; (2) an electrocoagulation (EC) system in combination with a conventional filtration system; (3) an ISM system; (4) an electro-coagulation (EC) unit in combination with a magnetic filtration unit (an EC/EMF system), or (5) an ISM system in combination with an EC/EMF system, for the upstream removal from the aqueous radwaste of one or more radionuclides that could otherwise act as a driver capable of causing excessive accumulation by a demineralizer before other contaminants are accumulated. Examples of potential drivers that result in wastes being more likely classified as Class B or C rather than Class A are Cs-131, Te-99, Sr-90 and 1-129 and the transition metal activation products, such as Ni-59, Ni-63, Mn-54, Fe-55, Fe-59, Co-58, Co-60, and Zn-65.

If the quantity of any one or more of the driver radionuclides in the aqueous radwaste is relatively small, a conventional coagulating and filtering system may be used to remove them rather than employing a more sophisticated system. If the quantity of any one or more of the driver radionuclides in the aqueous radwaste is relatively large, they may be removed by using one or more of the other systems described below. For example, the next stage after analysis and chemical adjustment of the radwaste tank or after treatment in an EC unit, may be treatment with a selective ion exchange media or EC seeding agent, such as removal means specific for removal of cesium, cobalt and/or nickel. It is noted here that the term ISM includes a wide variety of ion specific media, such as ion exchange resin, granulated carbon, granulated inorganic media, and the like.

EC in combination with an electromagnetic filtration (EC/EMF) system may be especially useful for removal of the cesium-137 isotope, in which case a magnetic seeding step can be used either before or after the EC unit, or before the EMF unit, for coupling this non-magnetic species to a magnetic moiety, e.g., KCCF (Potassium hexacyanoferrate), to form a magnetic chemical complex that may then be removed by electromagnetic filtration. The use of selective, sub-micron colloidal seeding agents with electro-coagulation and filtration is particularly effective for drivers such as cobalt, tellurium, strontium, iodine, in addition to cesium. This EC/EMF system is described in detail in the prior patent application filed on Dec. 14, 2005, as Ser. No. 11/303,065, the entire contents of this prior application being expressly incorporated herein by reference.

Therefore, a primary object of the present invention is to reduce the volume of Class B and C radioactive waste (radwaste), and thereby the number of Class B and C shipments of radwaste to disposal sites. At the present time, these shipments must go to only one of two operating waste disposal sites and are particularly expensive shipments because of ultimate disposal costs. Thus, reduction of shipments of these classes of radwaste is a desirable goal. According to the present invention, the reduction is achieved by carefully limiting to only Class A the type and quantity of radionuclides transferred from aqueous radwaste to downstream demineralizers by segregating upstream the waste radionuclides that tend to drive the overall waste products toward the B and C classifications. Since these "drivers" are actually minor constituents of the radwaste, they can be accumulated over time on certain ion specific removal means (ISM and EC seeding agents), thereby resulting in fewer shipments of Class B and C wastes.

A more particular object of the present invention is to remove at least one radionuclide driver, such as one of the above constituents, from aqueous radwaste waste to prevent ion exchange resins in downstream demineralizer vessels from becoming Class B or C radwaste. After the drivers are removed, the aqueous radwaste is pumped through the demineralizer vessels. By keeping track of the flow rate, the passage of time, and the amount of ion exchange resin, and knowing the chemistry of the feed tank waste minus the drivers and of the demineralizer effluent, the software can calculate in real time the radionuclide loading of each demineralizer vessel and trigger an alarm when the vessel media has reached about 90-95 percent (or even up to about 99%) of the maximum loading for Class A waste. As an initial indicator that maximum loading is approaching, gamma radiation monitors may be used to keep track of the gross buildup of this radiation emanating from the surface of the vessel, and these monitors may also be used to trigger an alarm when the loading for Class A waste has reached about 80-90 percent, preferably about 85 percent.

Immediately after the software alarm is triggered, the alarming demineralizer vessel is removed from the lead position (first-in-line service) and moved to the lag position until its media is depleted by non-radioactive ions, at which point the depleted vessel is packaged and then shipped to a disposal site as Class A waste. The previously removed drivers that were segregated from the aqueous waste upstream of the demineralizers continue to be accumulated on filter media and/or the ISM during multiple downstream demineralizing cycles, and the resulting contaminated filter media and/or ISM when depleted may then be stored until a full shipment of this Class B or C waste is obtained, or accumulated until it is GTCC, at which point the federal government becomes responsible for its disposal.

Referring now to the latter, the SMART™ System computer software continuously tracks media radioisotopic loading and calculates media waste classification. It provides an early warning to an operator that a particular media batch in a demineralizer is approaching the Class A waste disposal limit. By removing this media from service before the Class A limit is exceeded, disposal costs can be minimized. For this purpose, the SMART™ System provides database structures, relationships, and waste classification algorithms that can be used to build the software system for waste media tracking and classification. It also has the potential for adding manifesting capabilities (e.g., EPRI (Electric Power Research Institute) waste tracking software) to the SMART™ System by either incorporating existing manifesting software within it or of interfacing it with existing manifesting software.

Where the radwaste contains colloidal driver contaminates, the innovative application of seeding and use of an electro-coagulation (EC) unit may employed 1) to break the colloid by neutralizing the outer radius repulsive charges of similar charged colloidal particles, and 2) to cause these neutralized particles to flocculate and form a type of flocculant (floc) that is more readily filterable, and thus de-waterable. This EC unit electrolytically seeds the waste feed stream with a metal of choice, and without prior addition of chemicals common to ferri-floccing or flocculation/coagulation polymer addition. Once the colloid has been broken and floccing has begun, removal of the resultant floc can be carried out in a dewaterable high integrity container (HIC) or pressurized Liner, or by standard backwashable filters, cross-flow filters (e.g., UF), or, in simple cases, dead-end filters. Such applications include low-level radioactive waste (LLRW) from both PWRs and BWRs, fuel pools, storage basins, salt water collection tanks and the like.

For the removal of magnetic materials, such as some BWR suspended irons (e.g., boiler condensates and magnetite and hemagnetite), an electromagnetic filter (EMF) unit may be coupled with the EC unit. For the removal of non-magnetic materials, the EC treatment may be followed by treatment with a flocculating chemical, such as a flocculating polymer like Betz-1138 which is a polyacrylamide copolymer available from the Betz Corporation. For a waste stream containing magnetic materials and one or more non-magnetic species, e.g., cesium (Cs), a magnetic seeding step for coupling the non-magnetic species to a magnetic moiety, e.g., KCCF (Potassium hexacyanoferrate), to form a magnetic chemical complex may precede or follow the EC unit and then flow to the EMF unit, or the EC unit may be bypassed with the complex-seeded water flowing directly to the EMF unit, for the effective removal of this complex. Alternatively, after EC, the EMF can be bypassed with the complex-seeded water flowing directly to a filtration system Thus, the present invention may include a process, apparatus and system for removing driver contaminants from radioactive waste waters by using electro-coagulation in combination with an ISM System or EC seeding followed by filtration. The electro-coagulation may also be used to enhance the subsequent removal of driver contaminants by dead end filtration, high gradient magnetic filtration (HGMF), ultra-filtration (UF), back flushable filters (BFF), and high integrity containers (HICs) or Liners that are dewaterable with sheet filters. The electro-coagulation takes place after adjustments of the pH and the conductivity of the waste water, if needed. Sacrificial metal anodes, which may be iron, steel or titanium, but preferably are aluminum, are used in batch or continuous electrolytic processing of the waste water to seed it with positively charged metal ions that neutralize and agglomerate negatively charged ions, suspended particles and colloidal particles. The cathodes preferably are made of the same metal as the corresponding anodes.

The electro-coagulation (EC) process works on an electricity-based technology that passes an electric current through radioactive waste waters. Thus, electro-coagulation utilizes electrical direct current (DC) to provide cations from the sacrificial metal anodes (e.g., Fe, steel, Ti or Al ions) that agglomerate and thereby precipitate out undesirable contaminates, including dissolved metals and non-metals, e.g., antimony (Sb). The electrical DC current is preferably introduced into the aqueous feed stream via parallel plates constructed of the sacrificial metal of choice. This process may be used to avoid undesirable chemical additions (e.g., ferric chloride) to the waste water.

Moreover, the anode and cathode will hydrolyze water molecules, liberating oxygen and hydrogen as tiny bubbles, the former combining with many of the dissolved ions in the water to form insoluble oxides. The oxygen and hydrogen also will cause small, light particles to float and flocculate (e.g., oils and greases) so that they can also be skimmed or filtered. Some of these lighter particles are biological particles such as bacteria that have been destroyed by electro-osmotic shock.

The use of electro-coagulation on wastes containing driver radionuclides has several specific advantages in addition to the fact that it can cause the precipitation or flotation of at least some of these radionuclide species in the waste water. One of these is the oxidation of some species to render them stable in water. The oxidized species are then not toxic hazards and are not likely to be leached into the ground water if buried. The production of oxygen through hydrolysis may also act as a bactericide and fungicide to further remove wastes other than purely radioactive wastes. In addition, the waste waters may be contaminated by one or more of heavy metals, colloids, clay, dirt, surfactants, cleaners, oils, greases, biologicals, and the like, and as these contaminated waste waters are passed through one or more EC cells, a number of advantageous treatment reactions occur as described in the above-referenced prior application. The agglomerated particles from the EC unit may be removed from the waste water by conventional filtration techniques. Furthermore, many of the agglomerated particles may quickly settle out and these may be removed by simply decanting the clarified water.

The magnetic filter unit may comprise a ferromagnetic filtering medium that is temporarily magnetized when an electro-magnetic field is passed through it via a surrounding coiled electrical conductor. The medium (or media) may comprise steel sheets, screens, beads or balls, the last of these being preferred. Upon de-energizing the electromagnetic field, this filtering medium, which is preferably made of soft magnetic material (e.g. 430 stainless steel), is no longer magnetized to allow the filter to be back-flushed for removal of the coagulated contaminates by flushing them off the filtering media. Thus, the core of the magnetic filter preferably is not made of a permanently magnetizable material but of a soft magnetic material that is electro-magnetizable and then can be demagnetized by simply removing the magnetizing electrical current from the surrounding coil so that the filtering media, preferably 400 series (e.g. 430 S.S.) stainless steel balls, can be backflushed for reuse.

The use of an EMF for removal of radioactive precipitates may be particularly advantageous because these filtered precipitates may be easily backflushed to and handled by conventional radioactive waste (radwaste) disposal systems, thereby avoiding the need to dispose of a contaminated filter. As noted elsewhere, another important feature is that radio-nuclides which are not ferromagnetic, such as cesium-137, can be removed by the addition of a magnetic complexing agent, such as potassium hexacyanoferrate, which forms a magnetic complex with the radionuclides that can be removed by a magnetic filter (and alternatively by other filtration techniques). As used in this specification and the appended claims, the term electromagnetic filtration (EMF) includes high gradient magnetic filtration and other magnetic filtration techniques that magnetically remove ferromagnetic particles or precipitates and that permit the filtered out material to be backflushed to a radwaste system.

BRIEF DESCRIPTION OF THE DRAWINGS

The invention, including its operational steps and the components and systems for carrying out those steps, may be further understood by reference to the detailed description below taken in conjunction with the accompanying drawings in which:

FIG. 7 is a transportation type flow chart based on 10 CFR 71 that is useful in deciding whether to use a type A or type B cask for the shipment of a spent demineralizer.

DETAILED DESCRIPTION OF PREFERRED EMBODIMENT

Figure 1:
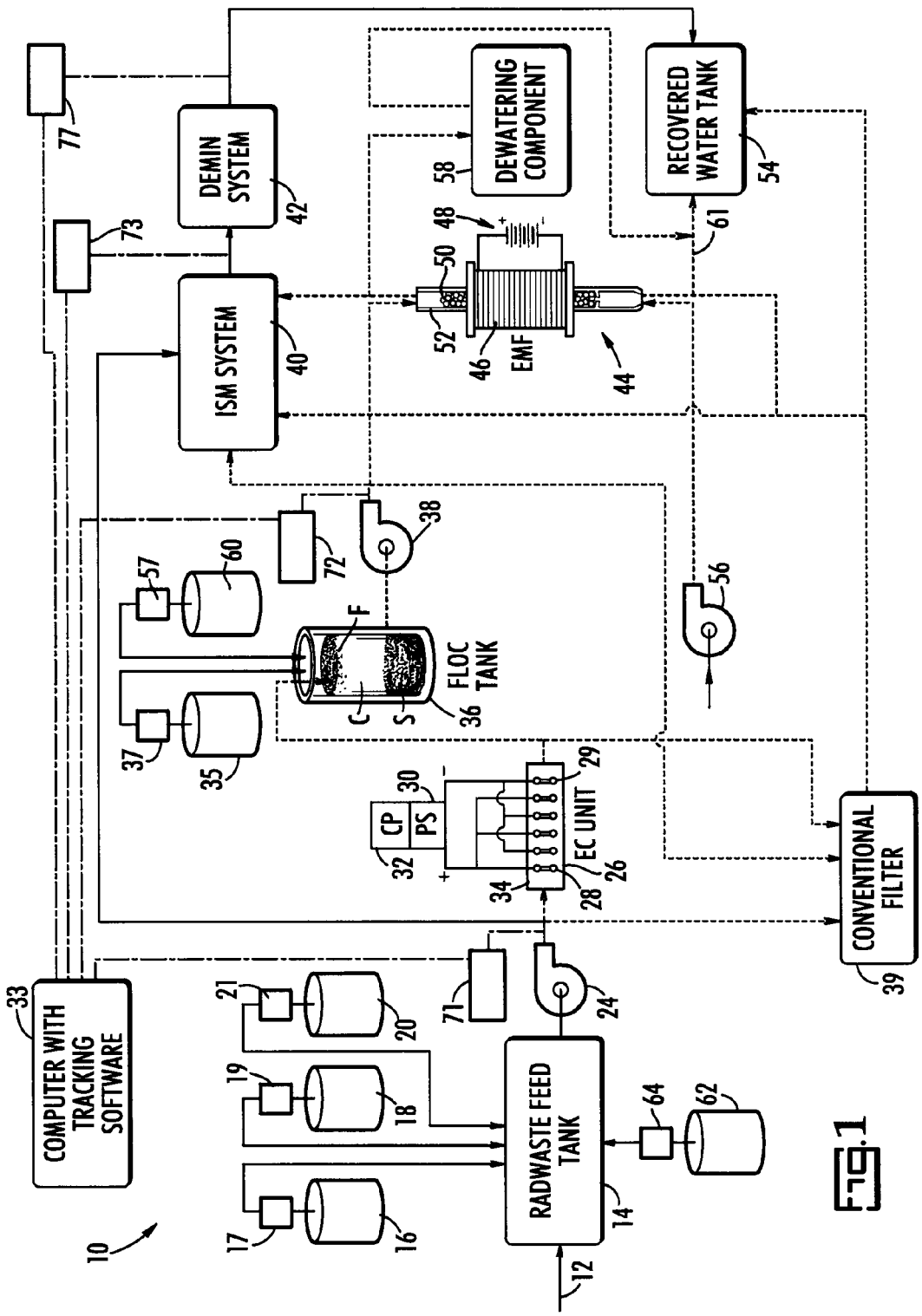
FIG. 1 is a diagrammatic illustration of the system of the invention for carrying out its processing of radioactive waste water, and illustrates use of an ion specific media system (ISM), an electro-coagulation unit and an electromagnetic filtering unit in accordance with the invention.

Referring now to FIG. 1, there is shown a radioactive water treatment system, generally designated 10. Depending on the contents of the radwaste influent 12, a precipitate inducing chemical and/or a flocculating inducing chemical may be introduced directly into a radwaste feed tank 14 from a supply tank 62 via a metering pump 64, and the resulting participates and/or floc removed by a mechanical separation device 39, such as conventional filtering equipment of the types described above. Depending on the chemical used, this floc may contain and assist in removing a specific driver radionuclide. Also, depending on the contents of the aqueous radwaste, the effluent from tank 14 and pump 24 may be sent preferably to an EC unit 26 or alternatively, to an ISM System 40 for further processing as described below.

Figure 2:
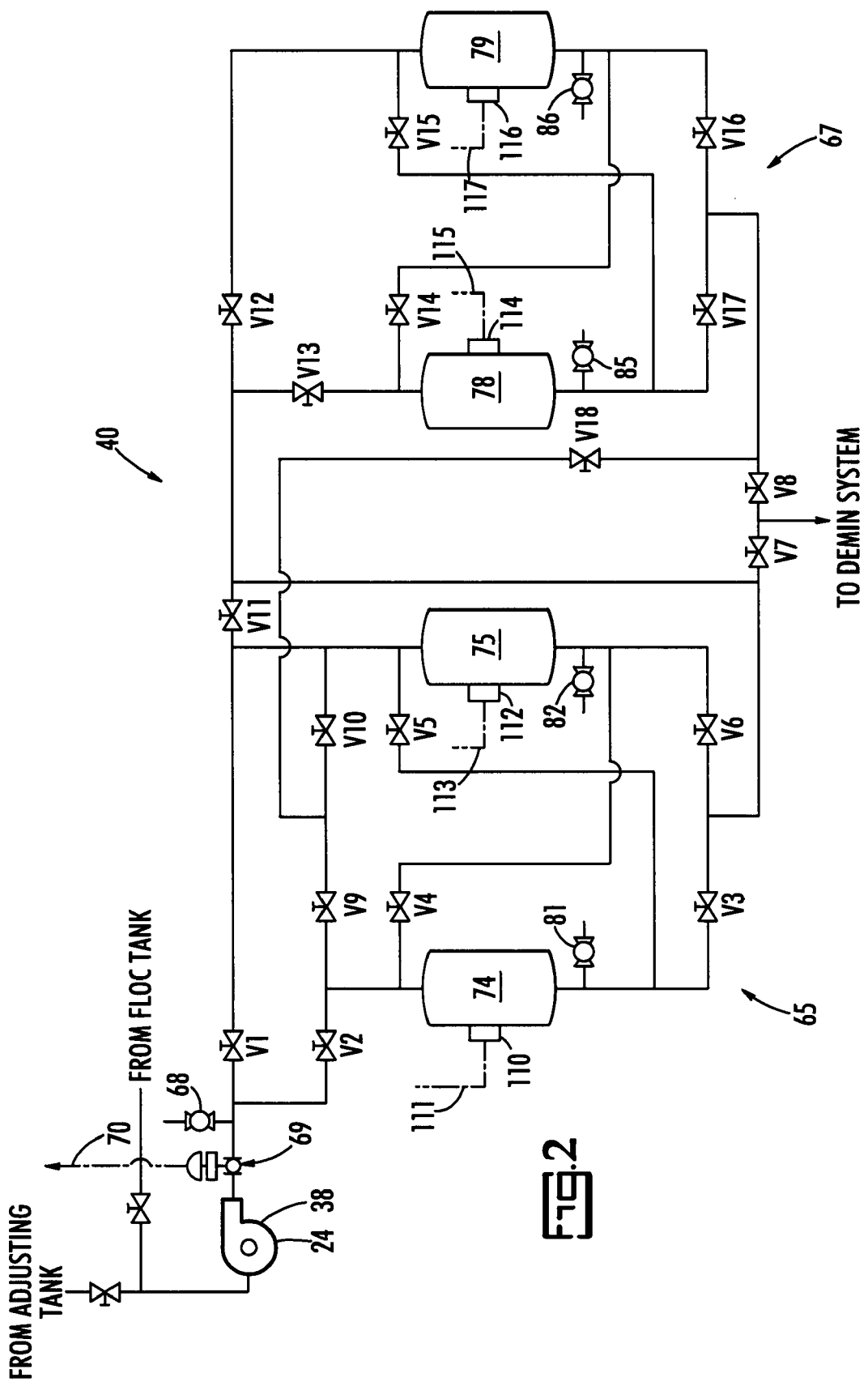
FIG. 2 is a diagrammatic illustration of the ion specific media (ISM) system of the invention.

It is believed that the most effective and economical removal of specific driver radionuclides can be achieved by employing the ISM System 40, which may comprise one or more ISM vessels containing ion specific media capable of removing at least one driver ion. The details of this system will now be described. Referring to FIG. 2, there is shown by way of example an arrangement of four ISM vessels each containing ion specific media (ISM), the vessels being arranged in two redundant systems 65 and 67. Influent may be fed to either system by the waste tank pump 24 or by the floc tank pump 38, the output of each of these pumps preferably including automatic flow rate measuring instrumentation 69 that communicates electronically with the computer 33 via a line 70. Furthermore, the systems 65 and 67 may be arranged in series or in parallel, or in reverse serial order wherein system 67 precedes system 65.

The first ISM system 65 comprises the two vessels 74 and 75 each containing an ion specific media. Although vessels 74 and 75 may contain different compositions of ISM, they preferably contain the same ISM so that each may serve as a backup for the other, that is vessels 74 and 75 are preferably redundant. Thus, vessel 74 may be first in line when removing a specific driver ion, such as Cs-137 and/or Co-60, from the waste water. Vessel 75 is also on line at the same time downstream of vessel 75 for three reasons: (1) to allow the smooth transition from vessel 74 to vessel 75 when vessel 74 is isolated so that its exhausted media may be sluiced out and replaced, (2) to serve as a backup should any breakthrough inadvertently occur while vessel 74 is first in line, and (3) to provide a lead-lag cyclic arrangement of these vessels that allows media loaded to its limit with radionuclides to be continued in service until it is depleted with non-radioactive ionic species. If this set up is for using only system 65, valves V2, V5, V6 and V7 are open and valves V1, V3, V4, V8, V9, V10, V11, V12 and V13 are closed.

Until vessel 74 is returned to service after its removal from service, the waste water would be directed only to vessel 75 by opening valve V1 and closing valve V2. The redundant vessel 75 (containing the same media as vessel 74) would thus allow continuous operation and would thereafter become the first vessel in line after vessel 74 is recharged and placed back on line by arranging the valving so that water flows first through vessel 75 and then through vessel 74. This valving arrangement is achieved by closing valve V6 and opening valves V4 and V3. The lead-lag operation of the ISM System continues with a cyclic switching of vessels 74 and 75 in terms of which vessel is first in line and which vessel is second in line to receive the flow of the waste water stream.

The second ISM system 67 comprises vessels 78 and 79 each preferably containing the same ion specific media, but ion specific media that is different from the media of vessels 74 and 75, such that when the systems 65 and 67 are valved in series, they will remove different driver radionuclides or other contaminating ions from the waste water. The ISM system 67 is provided with valves V12-V18 so that it may be operated in the same redundant and lead-lag fashion as ISM system 65. When these two ISM systems are operated in series, the valving of ISM 65 is arranged as first described above except valve V7 is closed, valves V13, V15, V16 and V8 are opened, valve V12 remains closed, and valves V14, V17 and V18 are also closed. When the vessel 78 needs to be valved out from service at the time its media reaches saturation, the waste water may be redirected first through only vessel 79 and then consecutively through both vessel 79 and vessel 78 by rearranging the valving in a manner similar to that described above for ISM system 65.

Figure 3:
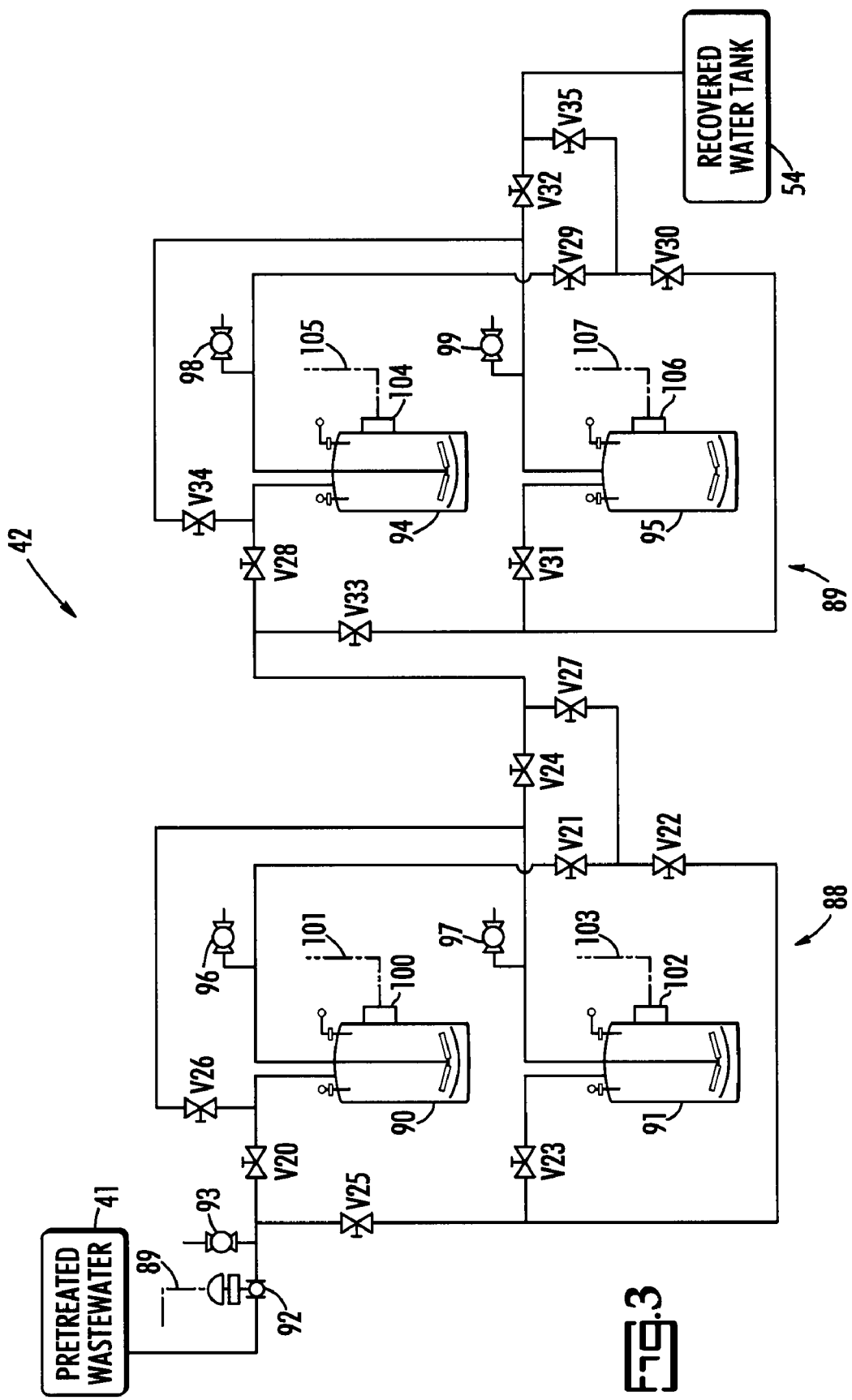
FIG. 3 is a diagrammatic illustration of the lead-lag demineralization system according to the invention.

The valving arrangements shown in FIG. 2 will also permit the ISM vessels 74, 75, 78 and 79 to be arranged in series without redundancy so that the influent waste water may pass consecutively through vessels containing four different types of ion specific media, each for removing a different specific driver radionuclide or other contaminate, before flowing onto the demineralization system 42 shown in FIG. 3. It is also contemplated the media in one or more of the ISM vessels 74, 75, 78 and 79 may be a mixed media for simultaneously removing two or more specific driver radionuclides or other contaminates.

While a conventional filtration system or the EC unit may be used for removal of bleed ions, it is also contemplated that the ion specific media in one or more of the vessels 74-79 may be of the type that removes at least one of these non-radioactive ions. These ions, such as from silicates or carbonates, are referred to above as "bleed" ions because they are capable of exhausting a demineralizer ion exchange media before it has reached its full capacity of radionuclides. In other words, by removing such bleed ions in advance of the demineralizer vessels, the amount of Class A waste may be reduced by allowing a full Class A loading of radionuclides on the demineralizer media before it is removed from service.

A manual influent water sampling station 68 may be provided upstream of the ISM systems 65 and 67 as shown in FIG. 2, or automatic influent water sampling instrumentation 71 and 72 may be provided for communication directly with computer 33 as shown in FIG. 1. As also shown in FIG. 2, at appropriate locations are various manual effluent sampling stations 81, 82, 85 and 86 for obtaining data on the radioactive and other ions in the effluent waters discharged from each demineralizer. Each of these effluent sampling stations may instead be automated and arranged to provide direct input into the computer 33 as illustrated by the automated sampling instrumentation 73 in FIG. 1. The instrumentation 69 for measuring the influent flow rate from pump 24 and/or pump 38 may also be automated to provide an electronic data input 70 (FIG. 2) to computer 33.

As also shown in FIG. 2, the ISM system 40 may include gamma detection instrumentation in the same manner as described below for the demineralizer system 42, i.e., gamma radiation monitors 110, 112, 114 and 116 may be provided adjacent to the surfaces of vessels 74, 75, 78 and 79, respectively, and connected by respective lines 111, 113, 115 and 117 to the computer 33 of FIG. 1 for providing direct inputs of radiation level data. If any one of these gamma radiation monitors reaches its set point, such as 80-85 percent of maximum, an alarm may be activated either directly or via the computer software to alert an operator that maximum radionuclide loading of the ISM may be approaching. The set point for each vessel may be determined from prior correlations between radiation levels and loading of the media with the driver radionuclide(s). If the tracking software confirms that a loading set point has indeed been reached, the corresponding loaded ISM vessel may be switched from being the lead vessel to being the lag vessel until its media becomes depleted by non-radioactive ions. This depleted media would then be sluiced (flushed) from the vessel, and the vessel recharged with fresh media and returned to service. Alternatively, the radionuclide loaded media may be immediately replaced without being used as a lag vessel media.

The pretreated waste water 41 flows from the ISM system 40 to a demineralization system 42, one preferred arrangement of which is shown in FIG. 3. As shown in this figure, the demineralization system 42 may comprise a cationic demineralization system 88 followed by an anionic demineralization system 89. As an alternative to the configuration shown, the ISM system 40 may be placed between demineralization systems 88 and 89, or the ISM system 40 may be placed after the demineralization system 89, i.e., after the demineralization complex 42 of FIG. 1. In a manner similar to the redundant and/or lead-lag arrangements of vessels in the ISM system 40 as described above, the cationic demineralization vessels 90 and 91 are preferably arranged in series so that one may serve as backup for the other. The anionic demineralization vessels 94 and 95 are also preferably arranged in series so that one may serve as backup for the other.

Vessels 91 and 95 are on line at the same time downstream of vessels 90 and 94, respectively, for three reasons: (1) to allow the smooth transition from the upstream vessel to the downstream vessel when the upstream vessel reaches its target waste classification, (2) to serve as a backup should any breakthrough inadvertently occur in the upstream vessel, and (3) to provide a lead-lag cyclic arrangement of the vessels that allows media loaded to its limit with radionuclides to be continued in service until it is depleted with non-radioactive ionic species. For the latter arrangement, vessel 90 and/or vessel 94 may be switched from being the lead vessel to being the lag vessel when the accumulation of radionuclides on its media reaches the target limit for ensuring that it is maintained as Class A waste, such as a set-point limit for gamma radiation of from about 80 to about 90, preferably about 85, percent of the target waste loading for Class A. The influent waste water would then be redirected to new lead vessel 91 while vessel 90 serves as a lag vessel for removal of non-radioactive ions. In the same fashion, vessel 95 may be switched to the lead vessel while vessel 94 serves as the lag vessel for removal of non-radioactive ions.

When depletion of the media for non-radioactive ions is reached, the lag vessel is then removed from service and replaced with a fresh vessel, and thereafter packaged for shipment to a Class A waste disposal site. The depleted lag vessel 90 is replaced with a new demineralizer vessel 90 containing fresh cationic media, and the depleted lag vessel 94 is replaced with a new demineralizer vessel 94 containing fresh anionic media. The new demineralizers 90 and 94 may then be placed in service as backup vessels such that vessels 91 and 95 remain the first in line for receiving the waste water. This cyclic lead-lag switching of vessels 90 and 91 and of vessels 94 and 95 allows continuous operation of the systems 88 and 89 while one of their vessels is out of service, and redundant backup operation when both of their vessels are in service. Alternatively, the radionuclide loaded demineralizer vessel may be immediately removed from service and packaged for disposal shipment without being used as a lag vessel.

To accomplish the cyclic switching described above, systems 88 and 89 are provided with the valving illustrated in FIG. 3. For example, when all vessels are in service, valves V20 to V24 of system 88 are open and valves V25 to V27 of this system are closed, and valves V28 to V32 of system 89 are open and valves V33 to V35 of this system are closed. As an example of switching vessel 91 ahead of vessel 90 and switching vessel 95 ahead of vessel 94, valves V25, V23, V26, V21 and V27 of system 88 would be opened, along with valves V33, V31, V34, V29 and V35 of system 89, and the remaining valves of both of these demineralizer systems would be closed.

As also illustrated in FIG. 3, the input water flow rate may be monitored by an automatic flow measuring device 92 for providing this data to the computer 33 via a line 89. This demineralizer system may also include a manual influent sampling station 93 and effluent sampling stations 96-99. Alternatively, each of these sampling stations may comprise automatic measuring instrumentation 77 connected to the computer 33 as shown in FIG. 1. In addition, gamma detection instrumentation 100,102,104 and 106 may be provided adjacent to the surfaces of vessels 90, 91, 94 and 95, respectively, and connected by respective lines 101, 103,105 and 107 to the computer 33 of FIG. 1. If any one of these gamma radiation monitors reaches its setpoint, an alarm is activated either directly or via the computer software to alert an operator that a category A waste limit may be approaching. If the tracking software confirms that the loading setpoint has indeed been reached, the corresponding depleted demineralizer vessel is removed from service and placed in a shielded shipping container for transfer to a disposal site licensed to receive such category A radwaste.

An example of an Ion Specific Media (ISM) or SMART™ Media (SM) would be a zeolite that is specific for cesium. Since cesium most likely will be present as a radioisotope in NPP waste waters, the zeolite, unlike a typical strong acid cation (SAC) resin, may be expected to load primarily with cesium species such as Cs-137. Based on an estimate of the maximum loading of radioactive cesium on the zeolite and the influent analysis and flow rate, an estimate may be made of the useful life of this ISM. With its preference for cesium, if this media were to be used in a demineralizer, dilution with an inert media might be necessary to keep the zeolite from exceeding Class A limits.

A cation exchange resin that has chelating properties for heavy metals also is a potential SMART™ Media. This resin should have a preference for radioisotopes such as Co-60 and Mn-54, instead of for non-radioactive species such as sodium and calcium that are main contributors to conductivity and that deplete SAC resins. As in the case of the Cs-specific zeolite, an estimate of the maximum loading of radioactive heavy metals on this resin could be made and used to estimate its useful life. By using an ISM that primarily removes radioactive cationic isotopes such as Cs-127, Co-60 and Mn-54, the volume of spent SAC resin generated could be drastically reduced or possibly eliminated. The ISM may be designed to remove a single driver species or may be a mixed media for simultaneously removing more than one driver species. By way of example, a listing of the ion specific media (ISM) useful in practicing the invention is set forth in Table II below.

TABLE II

ION SPECIFIC MEDIA (ISM)

| MEDIA NAME | APPLICATION |
|---|---|
| Ebony-T | Sb, Bi, Se, Te, As (granular) |
| Ebony Lite | Sb, Bi, Se, Te, As, Co (resin) |
| ASM 125 (FDR) | Sb Specific Media (Resin) |
| FDA-A | Sb or Te Specific Media (Granular) |
| MDA | Sb Spec. Media (Mn doped alumina) |
| FDC | Sb Spec. Media (Fe doped carbon) |
| AGC 5860 | Cobalt (Co 58 and Co 60) Specific Media |
| AGC 5563 | Iron (Fe 55) and Nickel (Ni 63) Specific Media (granular) |
| AGC 129 | Iodine (I 129) Specific Media (granular) |
| GT | Specialty Cation (Co) |
| GX | Specialty Cation (Co) |
| Cesium-T | Cs (Zeolite) |
| CsTrap | Cs Resin |
| Boron-S | Boron |
| GAC | Organics |
| Powdered Carbon | Organics |
| ASM 90 | Actinides (Sr and Al) |
| TSM 99 | Tc Specific Resin |
| MSM 5563 | Metal Spec. Media (Fe 55, Ni 63) |
| ISM 1 | Mixture of two or more ISM |
| ISM 2 | Chelating, Thiol (pH 2-10), Hg & noble metals(Ag, Cu, Pb, Cd, Zn, Ni) |
| ISM 3 | Iminodiacetate (Na+), HM polisher, (Cu, Ni, Co, Zn, Cd, Fe, Mn) |
| ISM 4 | Chelating Thiouronium (H+), (pH 2-6), Hg & noble metals (as cations) |
| ISM 5 | Aminophosphonic (H+ or Na+), (pH 1-12), divalent metals (and Fe+3) |
| ISM 6 | Cesium (Sr and NH4) specific Zeolite (granular) |
| ISM 7 | Weak base anion (Amine), Chromate & Dichromate, (pH 4-6.5) |
| ISM 8 | Oxygen Scavenger (sulfite form), (pH 1-14) |
| ISM 9 | As, Pb (& Fluoride) specific (granular AlO), (pH 4-10) |
| ISM 10 | Chelating Picolyamine (anion), (low pH, <2), Cu, Ni, Zn (w/ chelates) |

In addition to limiting spent demineralizer media to a Class A, the invention can reduce the total volume of spent media generated by NPP's. For example, as alluded to above, SAC resins that are commonly used at NPP's are sometimes depleted by non-radioactive species such as silicon, magnesium, sodium and calcium. These species are referred to herein as "bleeders". Another bleeder ion is Si (as aluminum silicate) which, like calcium and magnesium, may be easily removed by the EC system. Although the species do not affect the LLWR classification, another example would be the use of an antimony-specific media for removal of Sb-125 to reduce the volume of spent strong base anion (SBA) resin. Such antimony-specific media are identified in Table II above. Unlike typical SBA resins, this media also has the desirable attribute of not being affected by the presence of the borate ion, which is common in PWR nuclear power plants from the use of boric acid in reactor control.

In addition to the physical constraint methodology of limiting the media to a Class A level, a computer software is used to help track this waste classification system. Analyses of media bed influent and effluent streams throughout processing will provide as input to the computer software the isotopes present and their respective activity levels. With these data, calculations will be made of the cumulative progress toward reaching maximum permitted levels, as well as the potential for exceeding these levels. The results will provide an early warning to the operator that a demineralizer bed is approaching Class A limits. Upon reaching maximum levels, the media bed will be taken out of service, properly containerized, and shipped to a Class A repository.

The SMART™ System software therefore has the primary purpose of tracking radionuclide absorption by media and determining the waste classification of that media. This enables an operator to remove media from the system before it exceeds the Class A limit. A secondary purpose is to store water and media isotopic concentrations that enable operators to study media performance and optimize media use. Finally, a tertiary benefit is either to directly produce shipping manifest inputs or to interface with another software system that produces shipping manifests.

Thus, the present invention employs a computer program that tracks the radioisotopes absorbed within demineralizer or other waste treatment media and calculates its corresponding waste classification. By frequent recalculation of the media waste class, the program can alert an operator to remove the media from use before the Class A limit has been exceeded. Gathering enough water sample data on the influent waste water and the effluent product water to adequately define the isotopic loadings on the media is essential. Also, as a part of the SMART™ System, the invention contemplates combining Class A media with relatively low-level Class B media in order to change the volume of the Class B media sufficiently such that the entire mixture becomes Class A media.

The SMART™ System software preferably receives and reports information regarding the following:

(1) Batches of media—what type of media is it, when was it loaded into a vessel, who supplied it, when it was sluiced from a vessel into a High Integrity Container (HIC), what is its isotopic loading, what is its waste classification, and what is its transportation type?

(2) Media vessels—what batch of media it contains, what is its volume, and what is its sequence in processing radwaste water?

(3) HICS—what batch(es) of media it contains, what is its volume, what is its radionuclide content, and when was it disposed of?

(4) Water samples—where and when was the sample taken, what ions are in the water, what radionuclides are in the water, what is the pH, conductivity, temperature, and other properties of the water?

(5) Water processing transactions—when was water processed, who was the operator, what was the volume of water processed, what was its characteristics?

(6) Media inventory transactions—when was media moved, who was the operator, what batch was moved, and what vessel or HIC was it moved into?

(7) Media performance—reports and graphs of radioisotopes and their concentrations within the water and/or within the media as a function of time?

Data are preferably entered into the SMART™ System software in the same order as the process for treating the radwaste water and creating the media waste, this process being generally as follows:

(1) Media is procured and its characteristics are determined for each vessel.

(2) Characteristics of each vessel in which the media is placed are determined.

(3) The valve line-up for each vessel is established (i.e. the vessel sequence in water processing is established).

(4) Influent water samples are taken.

(5) Water is flowed through each vessel and radioisotopes are adsorbed on the corresponding media, (6) Isotopic loading of media is followed up to the load limit, at which point the media is sluiced from the vessel into a HIC.

(7) The HIC containing media is transported within a shielded cask to a disposal site or processing facility (existing manifesting software may be used).

Figure 4:
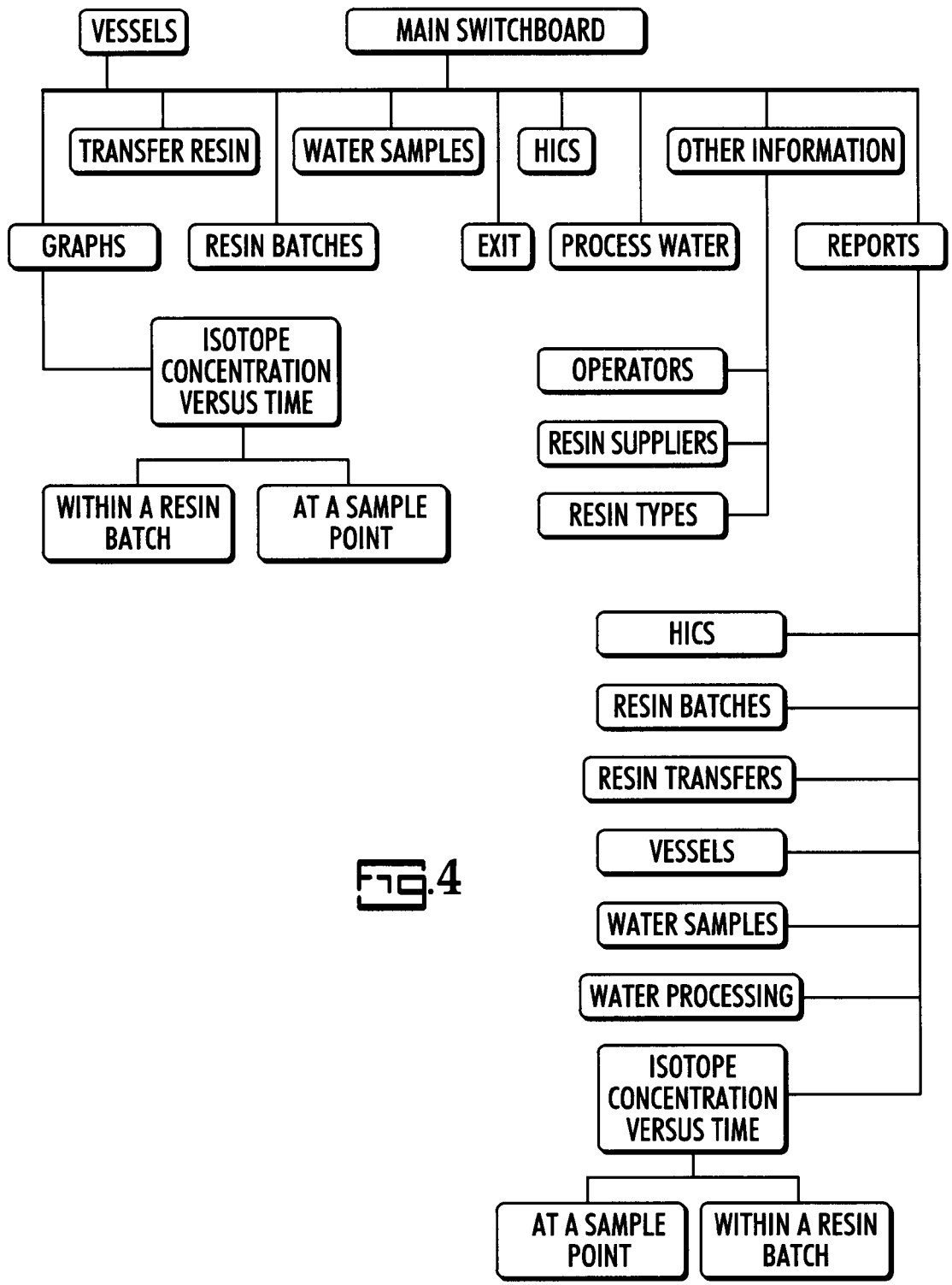
FIG. 4 is an illustration of the SMART™ System application structure of the invention.

FIG. 4 shows a preferred application structure for the SMART™ software. The application structure shown in FIG. 4 corresponds to the screens a user would see during application use. Specifically, the main application screen or "Main Switchboard" would list each of the options shown on the first row of the structure. Selecting one of these main-level options would present new options that are shown as subordinates in the application structure. Since the creation of shipping manifests is a capability that already exists in commercial software, it is not shown in FIG. 4, but is discussed further below.

Figure 5A:
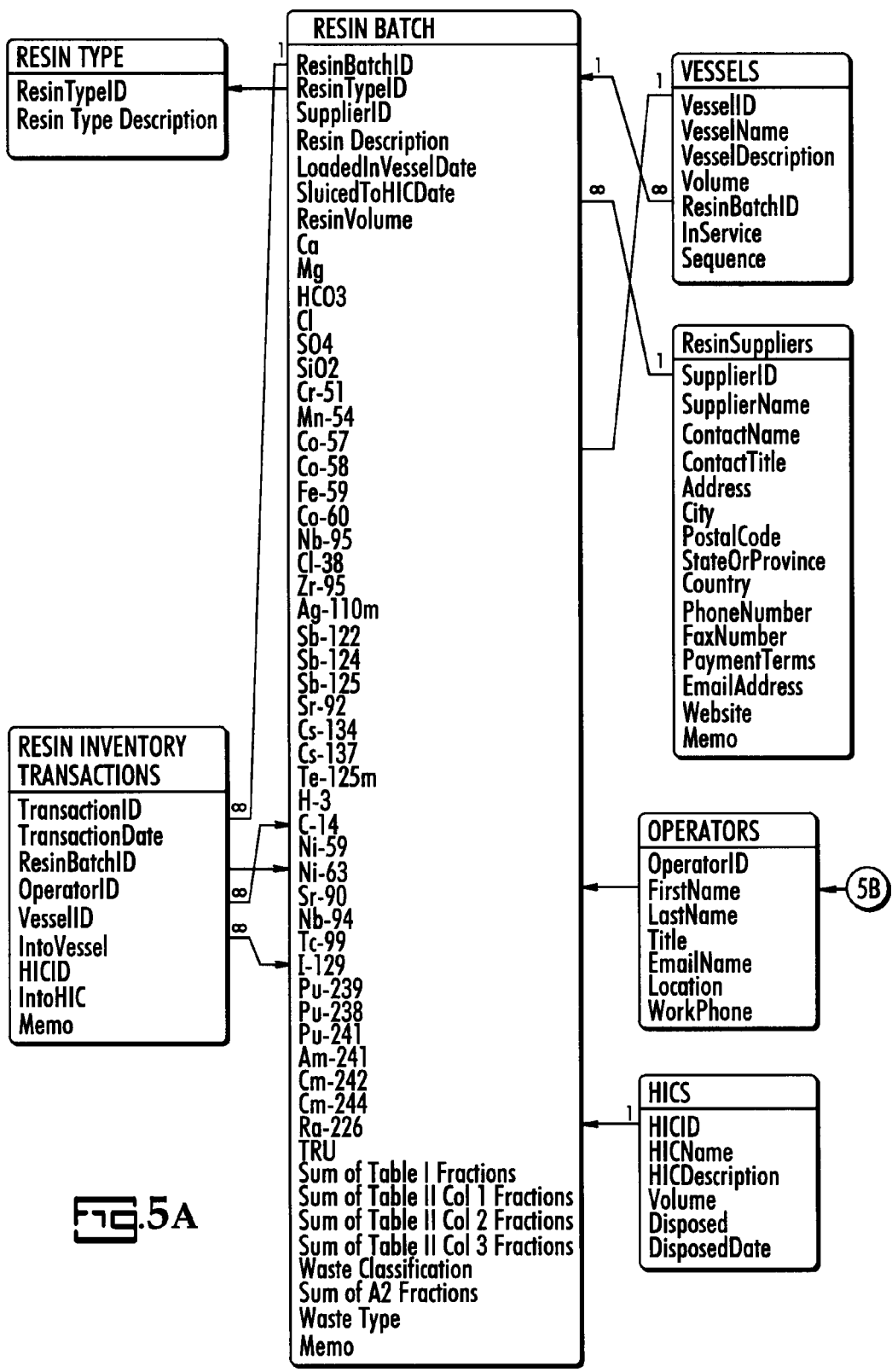
FIGS. 5A and 5B are a diagrammatic illustration of the SMART™ System databases and their relationships.
Figure 5B:
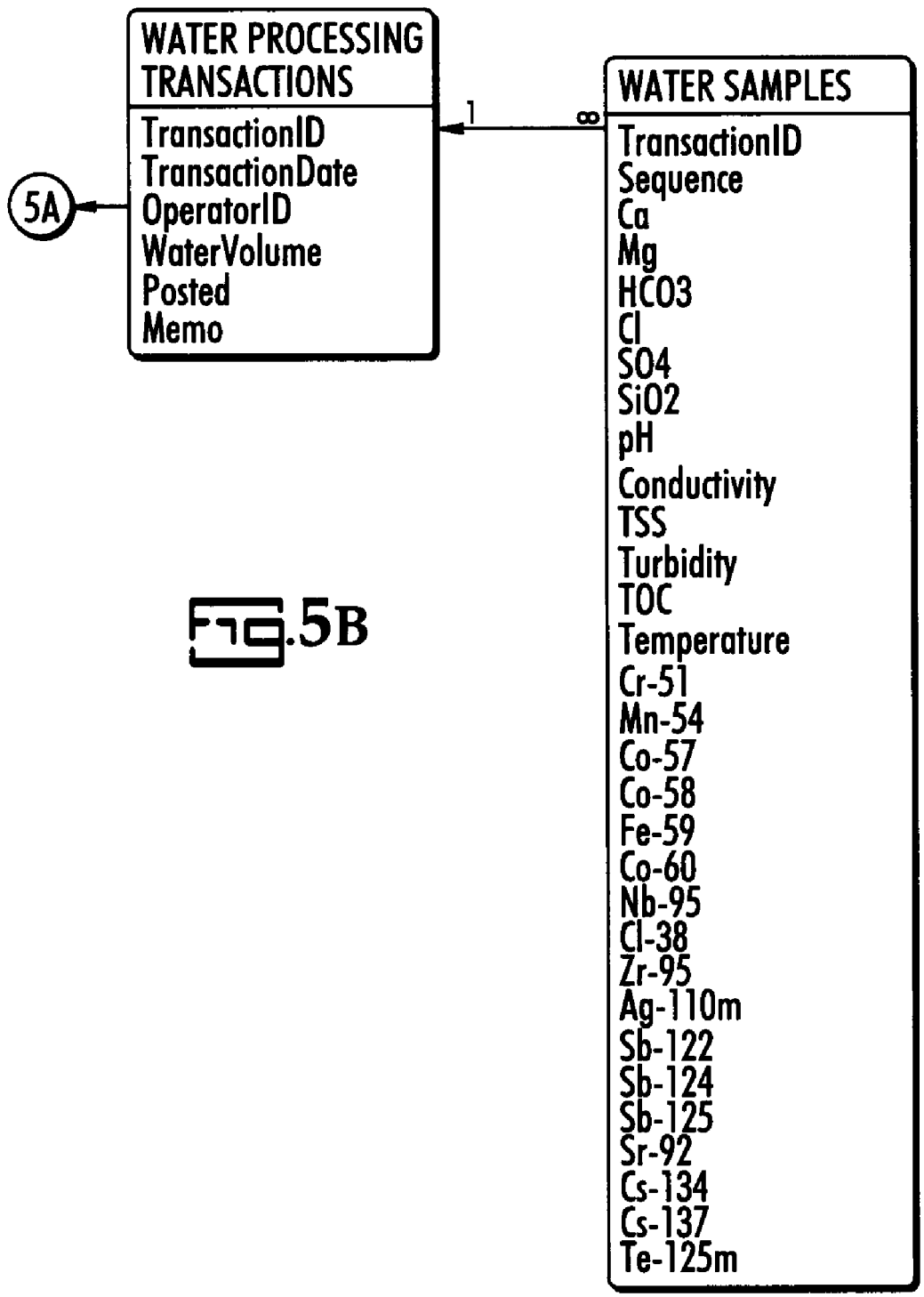

FIGS. 5A and 5B show the database structure and relationships between the databases of the SMART™ System program. The structure may be expanded by creating additional databases to store isotope names and concentrations. These added databases would be linked to those shown in FIG. 5. Although such an approach would add additional flexibility to the system, it is more difficult to program and may be omitted.

The purpose of each database is apparent from its name which appears within the band at the top of each of the rectangular databases. Field names are shown within the rectangles. The field types are not shown, but in general are as follows:

(a) Descriptions and names are fixed-length text fields.
(b) Transaction dates are date/time fields.
(c) Concentrations are given in scientific notation.
(d) IDs such as Media Batch ID or Vessel ID are integers. These are automatically generated in sequence after being first defined.
(e) Memo fields are "memo" fields (i.e. text fields with undefined length).

Relationships shown in FIGS. 5A and 5B obey the following conventions:

I. A simple arrow pointing from one database to another indicates a lookup. For example, Media Type ID is entered in the Media Batch database, and the Media Type Description is looked up within a second database that is linked to the first.

II. A relationship that shows an infinity symbol ("∝") at one end and the numeral "1" at the other is a one ("1") to many ("∝") relationship with referential integrity enforced and cascade update of related fields. Referential integrity is a set of rules that ensures that no related records can exist without a parent table. Cascade update of related fields automatically changes the foreign key value in a child table to match any changes in the value of the primary key field in the parent table. This preserves the relationship between parent and child tables.

The time history of media radioisotopic loading may be stored within the system to reduce programming effort. Adding this capability requires dividing the Media Batch database into two databases: a Media Batch database containing time-independent fields, and a second, linked Media-Loading database containing media radioisotopic loadings and other time-dependent fields. However, the time history may be omitted to reduce programming effort.

The primary system user is the on-site operator of the water processing system. This individual performs all data entry and has access to all graphing and reporting functions. Secondary users of the system may be process engineers located off-site. Since these engineers would be expected to access the system only infrequently to assist in problem solving, they would have access to exactly the same screens, reports, and graphs as the operators. Access to the SMART™ System program by off-site engineers may be provided through the Remote Assistance feature within WINDOWS XP or through remote access software such as MSN MESSENGER. Such off-site use of the SMART™ System would require the on-site operator to grant system access to the off-site engineer from time to time.

Reporting and graphing capabilities may be added to provide the process engineers with detailed time history of isotopic concentrations within water samples and histories of isotopic concentrations within media as a function of time.

Figure 6:
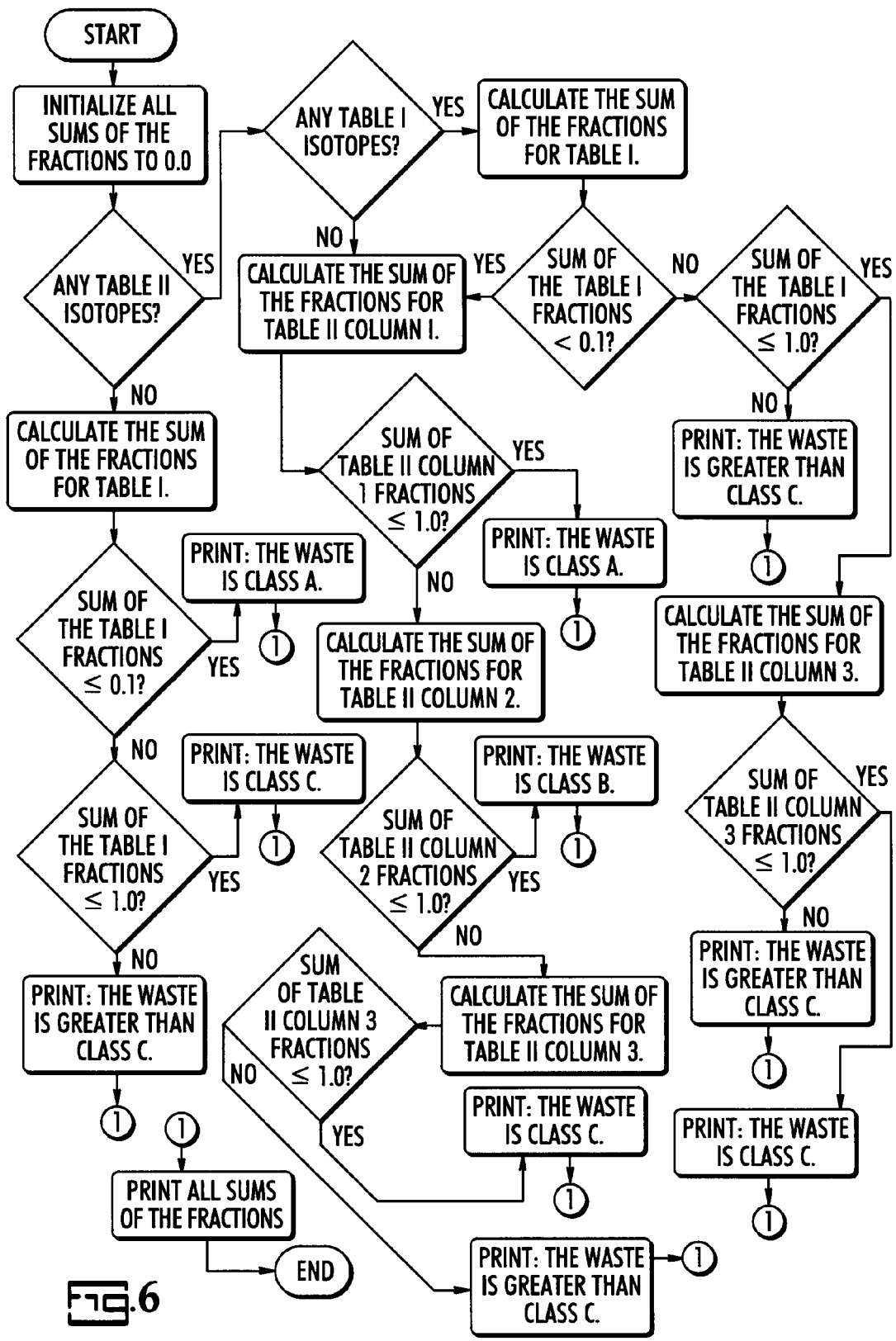
FIG. 6 is a waste classification flow chart diagramming the radwaste classification method according to the state of Utah's "Bulk Waste Disposal and Treatment Facilities Waste Acceptance Criteria"

Two additional parameters may be calculated by the software program: 1) the disposal classification and 2) the transportation type. The disposal classification may be calculated according to the method available from ES using Utah's Bulk Waste Disposal and Treatment Facilities Waste Acceptance Criteria. This disposal classification method is in accordance with the requirements of the Utah Administrative Code R313-15-1008, "Classification and Characteristics of Low-Level Radioactive Waste." It is similar to and should meet the requirements of the NRC Waste Classification requirements in 10 CFR 61.55, with the addition of Radium-226. FIG. 6 diagrams this classification method as a logic flowchart.

The transportation type may be calculated according to 10 CFR 71. The transportation type does not have the economic importance that waste classification does, but it is useful information in deciding whether to use a Type A or Type B cask for shipment. Type A casks have a lower rental cost than Type B casks. FIG. 7 diagrams the transportation type determination as another logic flowchart.

Implementing calculation of both the waste classification and the transportation type may be performed in a similar manner. Radioisotopic loading of a media batch is calculated by multiplying the difference of inlet and outlet concentrations by the volume of water processed and summing this product with the existing loading. Certain radioisotopes are not normally measured directly within the water, usually due to economic considerations. These may instead be estimated based on scaling factors that can be determined for each nuclear power plant. In the SMART™ System, all parameters such as scaling factors may be hard-coded within the program to minimize programming cost. Alternatively, the system may store scaling factors in a separate database to allow them to be easily tailored to the waste at a particular plant.

The SMART™ System software may be installed on a stand-alone PC. One software language that may be used is MICROSOFT ACCESS 2003 due to the wide-spread use of this database language and due to its high-level features that would enable a system to be rapidly tailored to a particular plant. The hardware and operating system may be a standard laptop or desktop PC running the MICROSOFT XP operating system. However, other database languages may be used if the software programmer feels another is superior to MICROSOFT ACCESS 2003 for this application (e.g., ORACLE or SEQUENCE).

Data may be manually entered through the user interface by an operator as often as water samples are taken, or may be obtained by remote instrumentation and inputted electronically. More infrequently, data may be entered manually by an operator when media is moved into or out of the water processing system. It is desirable that all data be entered by an on-site operator, and that the following guidelines apply to data entry:

(a) All entered data can be read and edited by any system user.

(b) All date and time entries have their formats checked by the system and the user either forced to use the correct format or else be notified that the format is incorrect.

(c) The system preferably can track when and by whom data were entered into the system.

(d) Manual system backups may be used before posting transactions. However, transaction roll-back capability, as well as storing a complete time history of media loading may be provided.

(e) Reports may be viewed on-screen and/or printed. In addition to standard printed reports, graphical reports may present isotopic concentrations versus time.

Use of the media isotopic loadings by manifesting software is a capability that may be provided by integrating existing manifesting software into the SMART™ System software, or, instead, interfacing the SMART™ System software with existing manifesting software. At least two different computer programs presently exist for generating shipping manifests: a spreadsheet version of RADCALC and RADMAN. RADCALC was originally developed in spreadsheet form by EPRI and, later, portions were converted to a database program for the U.S. Department of Energy by Westinghouse Hanford Company. The RADCALC spreadsheet calculates waste hydrogen concentration, waste classification, and transportation type. It may be desirable to interface or integrate the RADCALC spreadsheet with the SMART™ System. RADMAN is a commercial software product developed by WMG, Inc. It was approved by the NRC in 1983 and has been advertised as " . . . the standard for the nuclear power industry and is routinely used at over 95% of U.S. operating stations." It may be desirable to integrate or interface RADMAN with the SMART™ System.

After treatment to remove suspended solids and/or specific radionuclides, the waste water may be first processed through two cation resin demineralizer vessels 90 and 91 arranged in series and then through two anion resin demineralizer vessels 94 and 95, which also are in series. When the media bed in the leading (upstream) vessel of either of the two pairs of vessels becomes fully loaded with radionuclides, as determined by analysis of the vessel effluent, this loaded vessel may be placed in the lag position or bypassed. The bypassed vessel or the depleted lag vessel is usually replaced with a new vessel containing fresh media. Alternatively, the spent resin may be sluiced out and the old vessel refilled with new resin, depending on the type of vessel employed for demineralization. The replaced or refilled vessel is then put back in service as the following (downstream) rather than the leading vessel of the pair. By always having a fresh resin bed downstream, this cyclic mode of operation prevents an adverse effect on product water quality upon depletion of a lead media bed. FIG. 3 shows a valve and piping arrangement for two pairs of IX vessels that allows these various lineups to be achieved.

To monitor the loading of radioisotopes on the media beds, and thus the approach of the bed toward Class A limits, the information inputed to the computer software includes (1) the flow rate to the vessel, (2) identification of the radioisotopes in the vessel influent waste water, and (3) the activity levels (e.g., in mCi/ml) of each radioisotope in both the influent and effluent streams of the vessel. This information is known as a function of time since the loading of an isotope on the media bed is determined as the integral over time of the product of the flow rate and the difference between the influent and effluent activity levels. An example of an ideal situation is the batch processing of a well-mixed (i.e., homogenous in radioisotope activity levels) waste water feed tank at a constant feed rate to an ion exchange media vessel. Assuming no breakthrough of a particular radioisotope during processing, the loading of that radioisotope on the media bed is simply the product of the total volume of water processed from the feed tank and the activity level of the radioisotope as determined from analysis of the feed tank itself.

Analyses of resin bed influent and effluent streams throughout processing supplies the isotopes present and their respective activity levels as input to the computer software. The analyses of the waste water may be accomplished by manually withdrawing liquid samples from the processing system (at locations such as shown on FIGS. 2 and 3) and submitting them to the laboratory for isotopic examination. The results of the analyses would then be manually input to the computer. Another option is to have on-line instruments that identify the radioisotopes and their activity levels and sends these data directly to the computer for compilation and calculations. In a similar fashion, flow rate versus time data can be entered manually from the operator's data sheets. Alternatively, the flow rate data can be obtained in real time by the computer from a flow transmitter on the vessel feed line.

The benefits and advantages of the invention include:

(1) The availability of a permitted disposal site is assured at least for Class A waste if not also for Class B and C.

(2) Allows the choice to drive waste to a specific class. For example, instead of just separating Class A from Class B and C waste, the generator may want to drive the higher activity waste to Greater Than Class C (GTCC) for which the federal government has disposal responsibility.

(3) The cost per unit volume for disposal of seeding material or spent media is minimized, thereby reducing the total disposal cost for the same total volume generated.

(4) The total volume of seeding material or spent media could be significantly reduced, thereby further reducing the total disposal cost.

(5) The risks to personnel and the environment are reduced.

Referring again to FIG. 1, the EC unit 26, the Floc Tank 36 and, when appropriate, the EMF unit 44 may be useful as alternative or supplemental means to the ISM System for removing specific driver radionuclides, such as Cesium. Before the influent waste stream 12 is fed to the EC unit, its pH and conductivity may be adjusted in the radwaste feed tank 14. High pH may be adjusted downward by the introduction of an acidic solution (such as sulfuric acid or alum) from a tank 16, or low pH may be adjusted upward by the introduction of a basic solution (such as sodium hydroxide or sodium bicarbonate) from a tank 18. To raise the waste water conductivity, an electrolytic solution (such as sodium sulfate, alum or sodium bicarbonate) may be introduced into tank 14 from a tank 20. The conductivity also may be raised by introducing an iron component, such as magnetite into the radwaste feed tank 14, especially where the precipitates in the effluent water from the EC unit 26 are to be subsequently removed by an EMF unit 44. Finally, recycling the reject from a reverse osmosis membrane, such as one downstream of an EC unit to the upstream side of an EC unit, provides progressively higher conductivity feed to the EC unit.

In operating the electrocoagulation (EC) unit 26, a direct current is applied to a cathode-anode system 28, 29 in order to destabilize a variety of dissolved ionic or electrostatically suspended contaminants. During this electrolytic process, cationic species from the metal of sacrificial anodes dissolve into the water. These positively charged cations neutralize and thereby destabilize negatively charged contaminants and also create metal oxides and hydroxides which precipitate and bring down the neutralized contaminants as part of the flocculant. If aluminum anodes are used, aluminum oxides and hydroxides are formed. If iron anodes are used, iron oxides and hydroxides form. Aluminum anodes are preferred for the present invention because iron anodes become readily coated with iron oxide (rust), which interferes with the electrolytic process.

The formation of the metal oxides and hydroxides, and their subsequent precipitation, is similar to the processes which occur during coagulation or flocculation using alum or other chemical coagulants. The difference is that in electrocoagulation, the cationic species are produced by electrolytic dissolution of the anode metal instead of by adding a chemical coagulant. In addition, the activation energy provided by the application of an electrical current will promote the formation of oxides over hydroxides, which tend to be slimy and to clog filters. Metal oxides are more stable than the hydroxides and therefore more resistant to breakdown by acids. The dissolved contaminants, such as driver radionuclides, are incorporated into the molecular structure of these acid resistant precipitates by ion bridging and/or adsorption. Also, the weak intermolecular force known as van der Waalls' force causes these molecules to be attracted to one another and thereby coagulated into a floc. The precipitated floc is often capable of passing the requirements of the TCLP (the EPA's Toxicity Characteristic Leaking Procedure), which will significantly reduce solid waste disposal costs.

In addition, during the electrolytic process, oxygen gas is produced at the anode by the electrolysis of the water molecules. Simultaneous reactions take place at the cathode producing hydrogen gas from the water molecules. These gases can cause the coagulated floc molecules to float, and can also cause flotation and coagulation of oils, greases, and biological materials, such as the residue produced by the rupturing of bacteria and other microorganisms by electro-osmotic shock. The floating floc can be skimmed off for disposal, or it may be subjected to shaking or other turbulence to degas the floc and cause it to settle with the metal precipitates. The coagulation process preferably increases the size of submicron particles to particles as large as 100 microns, preferably to an average size of at least 20 microns so that the parcipitate particles are easily removable by a standard 20 to 25 micron filter.

It is preferred that the floc remove at least some of the dissolved metals that form metal oxides and/or hydroxides. However, another important cathodic reaction may involve the reduction of dissolved metal cations to the elemental state so that they plate out as a metal coating on the cathodes. Since at least some of these metals will be radioactive, the cathodes of the invention must be regenerated in place by reversing their polarity so that the process anodes become regenerating cathodes and the process cathodes become regenerating anodes to thereby unplate the metal coating from the process cathodes, and by providing a fluid flow past the regenerating anodes (i.e., the process cathodes) to carry off the unplated metal cations to a conventional radioactive waste disposal system.

For pH adjustment, an acid solution may be transferred to the radwaste feed tank 14 by a metering pump 17, or a base solution transferred by a metering pump 19. For conductivity adjustment, an electrolytic solution, such as sodium sulfate or sodium bicarbonate or the reject from a reverse osmosis membrane, may be transferred to the tank 14 by a metering pump 21. When the influent waste water is within the desired pH range of 5.5 to 8, preferably from 6.0 to 7.5, more preferably about 7.0, and the conductivity is in the range of 2 to 1000 μmhos, preferably at least 5.0 μmhos, more preferably at least 20 μmhos, most preferably in the range of 90 to 800 μmhos (tap water being about 200-300 μmhos), the adjusted waste water is transferred by a pump 24 to the electro-coagulation (EC) unit 26, which has a plurality of sacrificial metal anodes 28 connected in parallel to the positive terminal of a power source 30, and a plurality of cathodes 29 connected in parallel to the negative terminal of the power source 30.

The waste water fed to the EC unit 26 functions as an electrolyte 34 for carrying a current between the anodes 28 and the cathodes 29, the amount of this current depending on the conductivity of the waste water and the voltage across the terminals of the power source, which is regulated by a control panel 32. The applied voltage is preferably about 23-24 volts and the amount of direct current is preferably at least 3 amps, more preferably in the range of 4 to 6 amps, and most preferably about 5 amps. As explained elsewhere, electrolytic reactions and dissolution of the metal of the sacrificial anodes 28 cause coagulation of the dissolved, colloidal and suspended contaminants in the waste water to produce precipitates in the form of floc or sediment, either or both of which may contain one or more of the specific driver nuclide being removed. The coagulated floc produced by these parameters may sometimes be removable by a 20 to 25 micron filter or some other conventional filtration system 39, in which case the discharge of EC unit 26 may be directed to this system as shown in FIG. 1.

From the EC unit 26, the thus-treated waste water may instead flow to a floc and sediment tank 36, in which a portion of the precipitants may float as a floc F and a portion of the precipitants may settle out as a sediment S, an intermediate volume between the two being a clarified body of water C. To further enlarge the size of the floc and remove settled precipitates and any still-suspended precipitates in tank 36, in preparation for conventional filtration, a flocculation polymer, such as BETZ-1138, may be added to the contents of tank 36 from a supply tank 35 via a metering pump 37. At this point, the floating floc F may be skimmed off, the clarified water C decanted from the sediment S and sent on for further processing if needed.

The removed floc F and/or sediment S may then be transferred to a dewatering container such as a high integrity container (HIC) or a Liner with sheet filters and thereafter disposed of in conventional fashion. Alternatively, the floc tank 36 may be a HIC or a Liner with sheet filters for filtering out the floc and/or sediment. Thus, if significant amounts of the driver nuclides are present in the sediment and/or the floc, a conventional removal means, preferably a dewaterable HIC or pressurized Liner with sheet filters, may be used for separating these driver containing precipitates from the waste water. Other conventional removal means also may be used such as a high gradient magnetic filtration unit, an ultrafiltration unit, a microfiltration unit or a backflushable filter (BFF), all as represented by the box 39 designated as a conventional filter in FIG. 1. The filtered precipitates separated from the waste water by conventional filter unit 39 are then packaged and transferred to an appropriate radwaste disposal site, depending on their waste classification.

In some cases, further processing of the contents of tank 36 may be preferable to provide an effluent water containing even less contaminants than are present in the clarified water C. For further processing, either or both the sediment S and the floc F may be remixed with the clarified water C and the mixture transferred by a pump 38 to the ISM System 40 described above. Alternatively, as shown in FIG. 1, the mixture from tank 36 may be transferred by pump 38 to the conventional filtration system 39 or to an electromagnetic filter (EMF) unit 44, which may be made and operated in accordance with the disclosure of prior application Ser. No. 11/303,065 as incorporated herein by reference. If still further processing is needed or desirable, the effluent from the EMF unit 44 and/or from the conventional filtration system 39 may be sent to the ISM System 40 as illustrated in FIG. 1.

When the magnetic field of the EMF unit 44 is activated by applying to its electrical coils 46 a direct current from a power source 48, the portion of a ferro-magnetic filtering media bed 50 surrounded by the coil 46 is magnetized and thereby rendered capable of magnetically removing from the waste water any electro-coagulated precipitates containing a ferro-magnetic component, such as iron containing precipitates where the waste water influent 12 comes from a boiling water reactor (BWR). The ferro-magnetic filtering media bed 50 is made up of a plurality of small ferro-magnetic pieces, preferably small stainless steel balls of a soft, or temporary, magnetic material (e.g. 430 S.S.) that may have a smooth or multi-faceted surface (the former being preferred). The balls are stacked in a tubular housing 52 that is made of a non-magnetizable material and passes through the center of electrical coil 46.

The precipitate containing waste water preferably passes downward through the housing 52, the media bed 50 and the coil 46. The effluent from the EMF unit 44 may thereafter be sent to a recovered water tank 54 for discharge or recycle. Alternatively, this effluent may be sent to the ISM System 40 for further processing as described above. The structural details of a preferred embodiment of the EC unit and a preferred embodiment of the EMF unit are described in prior application Ser. No. 11/303,065.

While electric current from the power source 48 is passing through coil 46, the filtering media bed 50 is magnetized and therefore attracts and accumulates the ferro-magnetic precipitates in the waste water influent from floc tank 36. When the filtering efficiency of the EMF unit deteriorates to an unacceptable level, electrical current to coil 46 is turned off and the filtering media 50 is backflushed with a flow of uncontaminated water from a pump 56 to remove the now demagnetized precipitates from the filtering media bed 50 and carry them into a dewatering component 58, which is preferably a HIC or Liner with sheet filters or a BFF, but also may be another type of conventional filter. The clarified water recovered from dewatering container 58 may then be sent to the recovered water tank 54 for discharge or recycle. Alternatively, the backflush flow with demagnetized precipitates may be sent to the ISM System 40 for further processing as described above.

If the effluent from the EC unit as collected in tank 36 contains non-ferro-magnetic species such as cesium (Cs), this species may also be removed by the EMF unit by first adding to the contents of tank 36 a magnetic complexing agent from a magnetic seeding tank 60 via a metering pump 57. This complexing agent has a ferro-magnetic component and therefore forms a magnetic complex with the non-ferromagnetic species so that the EMF unit may be used for separating the resulting ferro-magnetic complex from the waste water. Where the non-ferromagnetic species is Cs, a preferred complexing agent is potassium cyanoferrate (which can also be readily filtered by other filtering technology).

As previously indicated, the cathode reaction may involve the reduction of dissolved metal cations to the elemental state so that they plate out as a metal coating on the cathodes 29. Because at least some of these metals are likely to be radioactive, it is preferable that these electrodes be cleaned of the deposited metals while remaining in place, instead of being removed for cleaning in a decontamination facility. Such cleaning in place is preferably accomplished by a temporary current reversal during which the EC anode becomes a cathode and the EC cathode becomes an anode to accomplish electro-cleaning. This current reversal causes the plated metals to be redissolved into a waste liquor which is then back-flushed to a conventional radioactive disposal system. In other words, the process anodes 28 become regenerating cathodes and the process cathodes 29 become regenerating anodes to reverse the direction of the current flow and thereby unplate the metal coating from the process cathodes. Continuing operation of pump 24 then provides fluid flow past the regenerating anodes (i.e., the process cathodes) that serves as a regenerating flush to carry off the unplated metal cations to floc tank 36 for subsequent removal as floc or sediment or by a one of the downstream systems described elsewhere herein.

The effectiveness of electro-coagulation (EC) may be increased by providing greater electrode contact time by lowering the flow rate or recycling the flow, by increasing the electrode area immersed in the electrolyte, by increasing the current density between the anodes and cathodes, such as by jumpering electrodes of the same type where they are connected in series between the positive and negative terminals (thereby connecting them in parallel), and/or by raising the conductivity by adding sodium sulfate, alum or bicarbonate of soda or by directing a different waste stream of higher conductivity into the waste stream entering the EC unit.

The preferred parameters for the magnetic filter is to apply 10 amps of direct current at 36 volts to the conductor coils surrounding the core of stainless steel ball bearings 74, each preferably having a diameter of about 0.2-0.5 centimeters (cm), more preferably 7/32 inch diameter balls. The stainless steel balls used should serve as a soft magnetic core that does not stay magnetized in the absence of direct current through the surrounding coils. If a hard magnetic core is used, an alternating current must subsequently be applied to the coil to "demagnetize" the hard metal core that would otherwise retain its magnetism.

If the amount of ferromagnetic material in the waste water is low, the effectiveness of electromagnetic filtering (EMF) may be enhanced by the addition of magnetite as a seeding agent to the waste water before it is subjected to electro-coagulation. If the clarified water leaving the combined EC-EMF system has a conductivity that is too high for disposal, reuse, recycle or further treatment, the conductivity may be lowered by passing the clarified water through ion exchange media of the types described above.

As will be apparent to one of ordinary skill in the art of waste treatment, many other modifications and substitutions may be made to the preferred embodiments described above without departing from the spirit and scope of the present invention as defined by the claims set forth below.

What is claimed is:

1. A process for treating waste water containing contaminants to prevent excessive accumulation of at least one of said contaminants on demineralizer media, said process comprising:
    determining the amounts of each of said contaminants in an influent stream of said waste water;
    selecting at least one of said contaminants as a driver contaminate capable of excessive accumulation on a demineralizer media before at least one other of said contaminants can reach a predetermined level of accumulation on said demineralizer media;
    treating said waste water with ion specific removal means for specifically removing said driver contaminant from said waste water while leaving a significant amount of said other contaminant for subsequent removal by said demineralizer media, said removal means being located upstream of said demineralizer media; and,
    supplying said treated waste water to said demineralizer media subsequent to removal of said driver contaminant by said ion specific removal means such that said other contaminant can reach said predetermined level of accumulation on said demineralizer media.

2. The process of claim 1 further comprising monitoring the amount of accumulation on said demineralizer media of said at least one other contaminant, and terminating the supplying of said treated waste water to said demineralizer media when said accumulation reaches said predetermined level.

3. The process of claim 2, wherein said at least one other contaminant is radioactive and emits detectable radiation and said monitoring step comprises detecting the level of said radiation, and wherein said terminating step is initiated when said radiation reaches a predetermined level.

4. The process of claim 2 further comprising determining the amount of said at least one other contaminant in an effluent stream of water from said demineralizer media, and determining the flow rate of at least one of said influent and effluent streams; wherein said monitoring step comprises the using software and a microprocessor for calculating the amount of said accumulation based on said flow rate and a difference between the amounts of said at least one other contaminant in said influent and effluent streams; and wherein said terminating step is initiated when said calculated amount reaches said predetermined amount.

5. The process of claim 3 or claim 4 further comprising activating an audible, a visual or both an audible and a visual alarm when said accumulation reaches said predetermined amount.

6. The process of claim 1, wherein said treating step comprises passing said waste water through ion exchange media having a composition selected specifically for removal of said driver contaminant.

7. The process of claim 1, wherein said treating step comprises treating said waste water with a chemical composition to produce a precipitate specifically containing said driver contaminate, and passing said treated waste water through a filter medium capable of removing said precipitate.

8. The process of claim 1, wherein said treating step comprises the steps of:
   treating said waste water with an electro-coagulating seeding agent adapted to attach said driver contaminant; and
   passing said treated waste water through an electro-coagulation system adapted specifically for coagulating said driver contaminant so that said driver contaminant is capable of being removed by a filtration step.

9. The process of claim 1, wherein said treating step comprises passing said waste water through an electro-coagulation system adapted specifically for coagulating said driver contaminant in a floc capable of being removed from said waste water by a filtration step.

10. The process of claim 9, wherein said treating step further comprises passing said waste water through an electromagnetic filter after its passage through said electro-coagulation system.

11. The process of claim 1, wherein said driver contaminate is a radionuclide or a bleeder ion.

12. The process of claim 1, wherein said waste water contains contaminants in the form of ions, colloids, suspended solids or combinations thereof having negative charges, said process further comprises:
   passing an electric current through a quantity of said water placed between an anode means and a cathode means to cause electro-coagulation of said contaminants, said anode means comprising at least one anode element made of a metal that dissolves in said water to provide cations of said metal for neutralizing the negative charges on said contaminants and to form oxide or hydroxide precipitates of said metal containing said driver contaminant; and,
   separating said precipitates from said quantity of waste water to provide a water effluent having substantially less driver contaminant than was present in said waste water before said electro-coagulation.

13. The process of claim 12, wherein before said electric current is passed through said waste water, a compound is added to said waste water to bring its pH into a range of 6 to 8.

14. The process of claim 12, wherein before said electric current is passed through said waste water, a compound is added to said waste water to bring its conductivity into a range of 2 to 1000 μmhos.

15. The process of claim 12, wherein a reverse osmosis membrane is located downstream of said anode and said cathode and where before said electric current is passed through said waste water, reject of a reverse osmosis membrane is recycled to said waste water passing between said anode and said cathode to bring the conductivity of said waste stream into a range of 2 to 1000 μmhos.

16. The process of claim 12, wherein particles of said precipitates have an average size, and wherein said process further comprises adding a flocculating polymer to the waste water from said electro-coagulation to increase the average size of said particles before said precipitates are separated from said waste water.

17. The process of claim 12, wherein at least a portion of said contaminates are non-ferromagnetic, and said process further comprises adding a compound to said waste water having a ferromagnetic component, said compound forming a ferromagnetic complex with said non-ferromagnetic contaminants, and wherein said separating step comprises using an electromagnetic filter for separating said ferromagnetic complex from said waste water.

18. The process of claim 17, wherein said non-ferromagnetic contaminate portion contains cesium and said added compound is cobalt hexaferrocyanate.

19. The process of claim 17, wherein said electro-magnetic filter comprises a filtering media surrounded by an electromagnetic coil, and wherein said filtering media comprises a bed of magnetizable pieces.

20. The process of claim 12, wherein at least a portion of said precipitates contain a ferromagnetic component, and wherein said separating step comprises using an electromagnetic filter for separating said ferromagnetic precipitates from said waste water.

21. The process of claim 12, wherein said anode means comprises at least one sacrificial element made of aluminum or titanium.

22. The process of claim 12, wherein said anode means comprises at least one sacrificial element made of iron or stainless steel.

23. The process of claim 12, wherein said anode means comprises a first set of plates of said metal and said cathode means comprises a second set of plates alternating with and arranged in parallel to said first set of plates; and wherein said first set of plates are connected in series to a positive terminal of an electrical power source, and said second set of plates are connected in series to a negative terminal of said power source.

24. The process of claim 12, wherein said anode means comprises a first set of plates of said metal and said cathode means comprises a second set of plates alternating with and arranged in parallel to said first set of plates; and wherein said first set of plates are connected in parallel to a positive terminal of an electrical power source, and said second set of plates are connected in parallel to a negative terminal of said power source.

25. The process of claim 12, wherein at least a portion of said precipitates contain radioactive and ferromagnetic components; wherein said separating step comprises using an electromagnetic filter for separating at least said precipitates portion from said waste water by accumulating it on a ferromagnetic filtering medium magnetized by an electromagnetic field; and wherein said process further comprises periodically removing said electromagnetic field to demagnetize said filtering medium and to release an accumulation of said precipitates portion from said filtering medium, and then providing a flow of liquid through said filtering medium to flush away said released waste and convey it to a means for handling radioactive waste.

26. The process of claim 12, wherein said anode means is connected to a positive terminal of an electrical power source and said cathode means is connected to a negative terminal of said power source so that said electric current flows through said water quantity in a direction that causes radioactive deposits to accumulate on said cathode means; and wherein said process further comprises periodically connecting said anode means to said negative terminal and said cathode means to said positive terminal so that the direction of said current flow is reversed and an accumulation of said radioactive deposits is released, and then providing a flow of liquid past said cathode means to flush away said released accumulation and convey it to a means for handling radioactive waste.

27. The process of claim 12, wherein particles of said precipitates have an average size, wherein said process further comprises adding a flocculating polymer to the waste water from said electro-coagulation to increase the average size of said particles before said precipitates are separated from said waste water, wherein at least a portion of said precipitates contain a ferromagnetic component, and wherein said separating step comprises using an electromagnetic filter for separating said ferromagnetic precipitates from said waste water.

28. The process of claim 1, wherein said driver contaminate is radioactive and comprises an Sb-125, I-129, Mn-54, Fe-55, Fe-59, Co-58, Co-60 or Zn-65 isotope, or a combination of two or more thereof.

29. The process of claim 28, wherein said driver contaminant is accumulated until it exceeds Classes B and C limits from Table 1.

30. The process of claim 1, wherein said driver contaminant is a bleeder.

31. The process of claim 1, wherein said driver contaminant is boron.

* * * * *